United States Patent
Rampp

(10) Patent No.: US 7,273,222 B2
(45) Date of Patent: Sep. 25, 2007

(54) PIVOTABLE TOWING DEVICE FOR TOWING VEHICLES

(75) Inventor: Armin Rampp, Ursberg/Bayersried (DE)

(73) Assignee: Al-Ko Kober AG (DE)

( * ) Notice: Subject to any disclaimer, the term of this patent is extended or adjusted under 35 U.S.C. 154(b) by 280 days.

(21) Appl. No.: 10/506,174

(22) PCT Filed: Feb. 27, 2003

(86) PCT No.: PCT/EP03/02008

§ 371 (c)(1),
(2), (4) Date: Aug. 27, 2004

(87) PCT Pub. No.: WO03/072375

PCT Pub. Date: Sep. 4, 2003

(65) Prior Publication Data

US 2005/0167946 A1    Aug. 4, 2005

(30) Foreign Application Priority Data

Feb. 28, 2002 (DE) ............................ 202 03 270 U
Oct. 9, 2002 (DE) ............................ 202 15 508 U

(51) Int. Cl.
*B60D 1/06* (2006.01)
(52) U.S. Cl. .................................................. 280/491.3
(58) Field of Classification Search ............. 280/291.1, 280/291.3, 491.1, 491.3
See application file for complete search history.

(56) References Cited

U.S. PATENT DOCUMENTS

| | | |
|---|---|---|
| 4,109,930 A | 8/1978 | Pilhall |
| 4,499,790 A | 2/1985 | Helms |
| 5,584,621 A | 12/1996 | Bertsche et al. |
| 6,547,271 B2 * | 4/2003 | Kleb et al. ............... 280/491.3 |
| 7,029,022 B2 * | 4/2006 | Moss ....................... 280/491.3 |

FOREIGN PATENT DOCUMENTS

| | | |
|---|---|---|
| DE | 195 21 896 | 1/1997 |
| DE | 196 54 867 | 8/1997 |
| DE | 196 12 961 | 10/1997 |
| DE | 197 11 535 | 9/1998 |
| DE | 197 15 469 | 10/1998 |
| DE | 198 48 487 | 5/2000 |
| DE | 198 58 978 | 6/2000 |
| DE | 198 59 961 | 7/2000 |
| DE | 200 16 618 | 1/2001 |
| DE | 199 44 082 | 3/2001 |
| DE | 100 04 523 | 8/2001 |

(Continued)

*Primary Examiner*—Kevin Hurley
(74) *Attorney, Agent, or Firm*—McGlew and Tuttle P.C

(57) ABSTRACT

A towing device (1) for towing vehicles has a tow bar (8) movably mounted about at least two axes of rotation, and at least one mechanical drive (13) for moving the tow bar between an operating position and a position of rest. The drive has a mechanism (14) for generating an at least partially superimposed movement of the tow bar about both axes. The preferred features include the axes of rotation being positioned at right angles to each other. The mechanism is designed as a gear unit (21) coupling the pivot axis (16) and the axis of rotation (18). The rotational movement of the tow bar about the axis of rotation is derived from the pivoting movement of the tow bar or a housing (19).

22 Claims, 18 Drawing Sheets

FOREIGN PATENT DOCUMENTS

| | | |
|---|---|---|
| DE | 100 17 013 | 10/2001 |
| DE | 100 23 640 | 11/2001 |
| DE | 101 04 185 | 7/2002 |
| DE | 101 04 186 | 7/2002 |
| EP | 0 799 732 | 10/1997 |
| EP | 1 009 088 | 6/2000 |
| EP | 1 225 067 | 7/2002 |
| WO | WO98/57813 | 12/1998 |

* cited by examiner

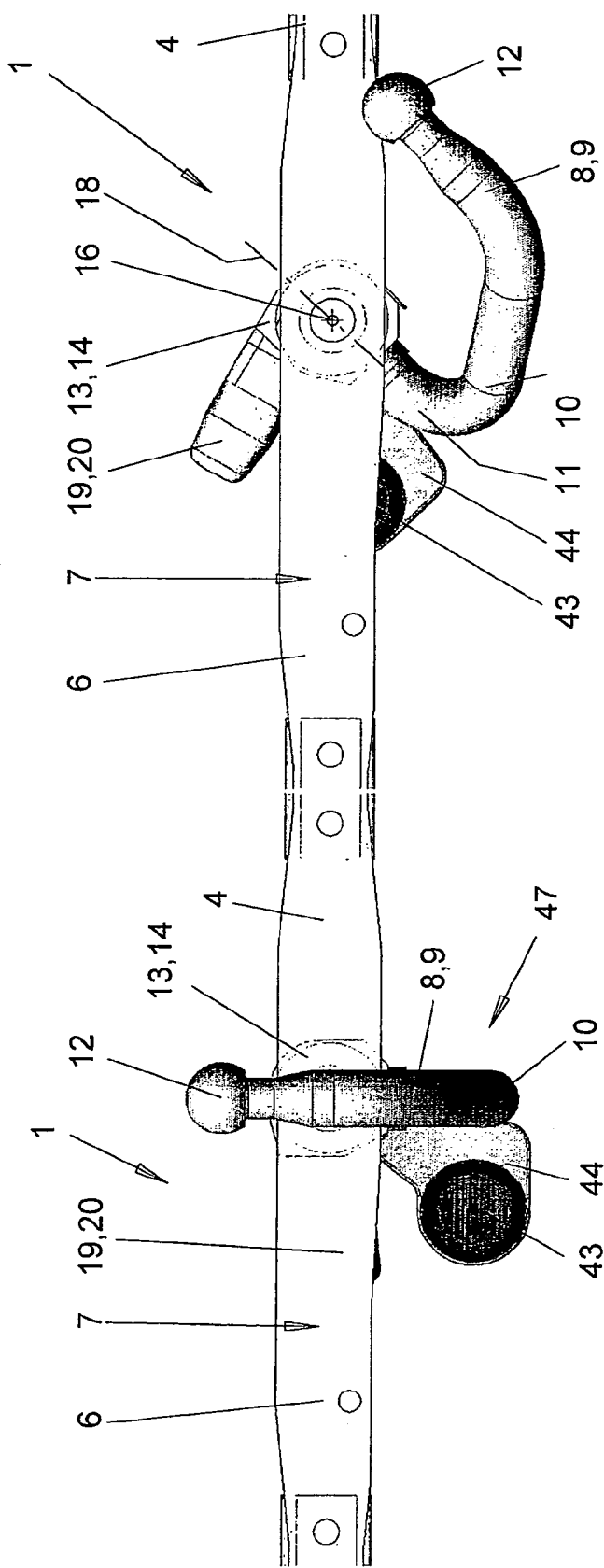

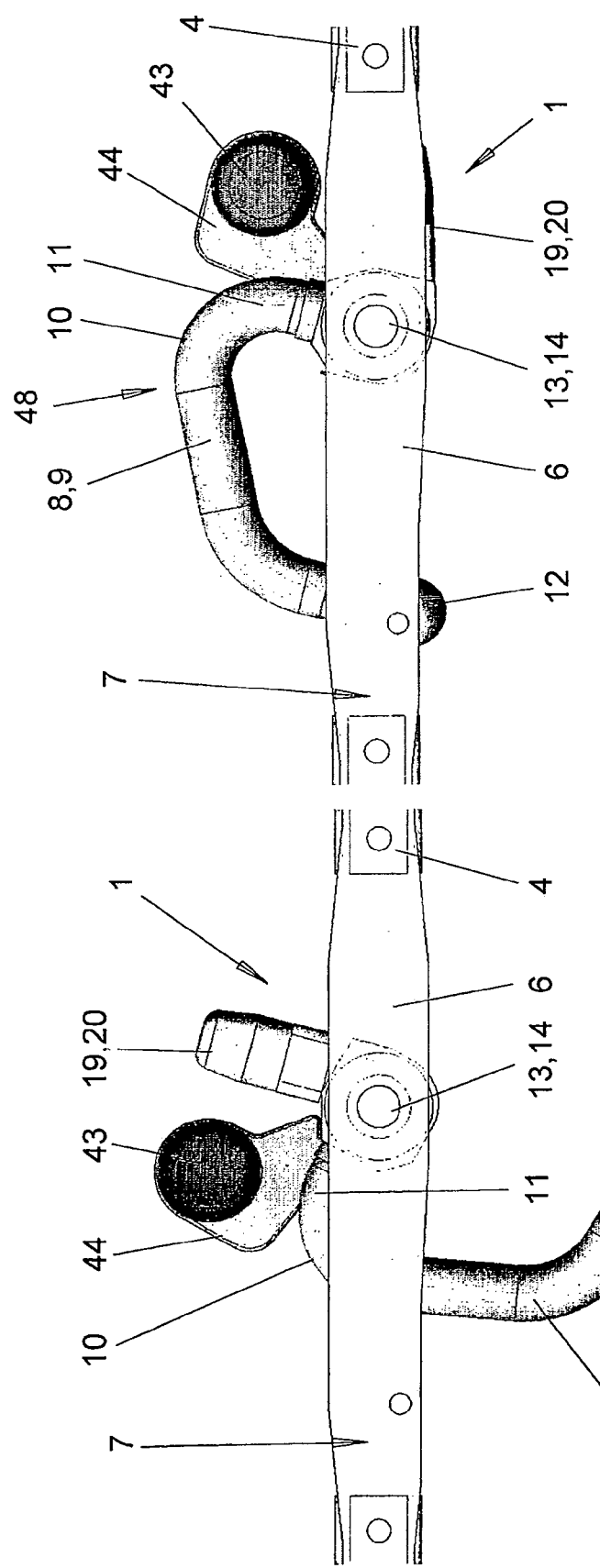

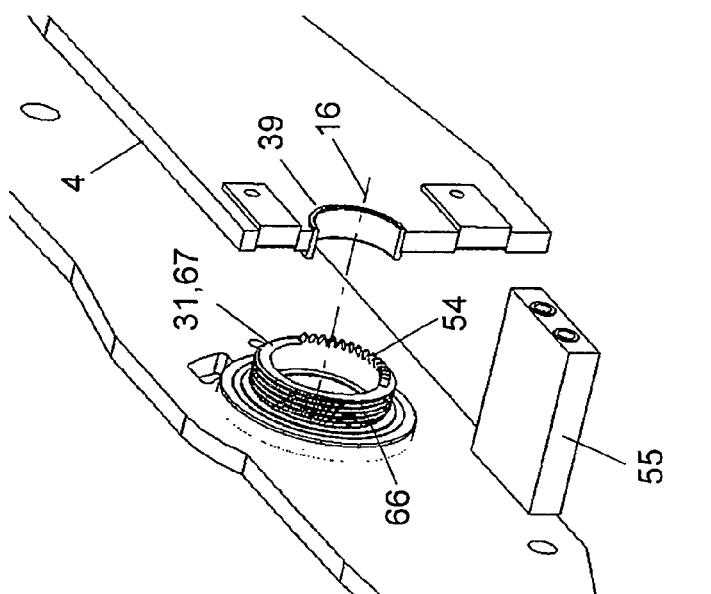
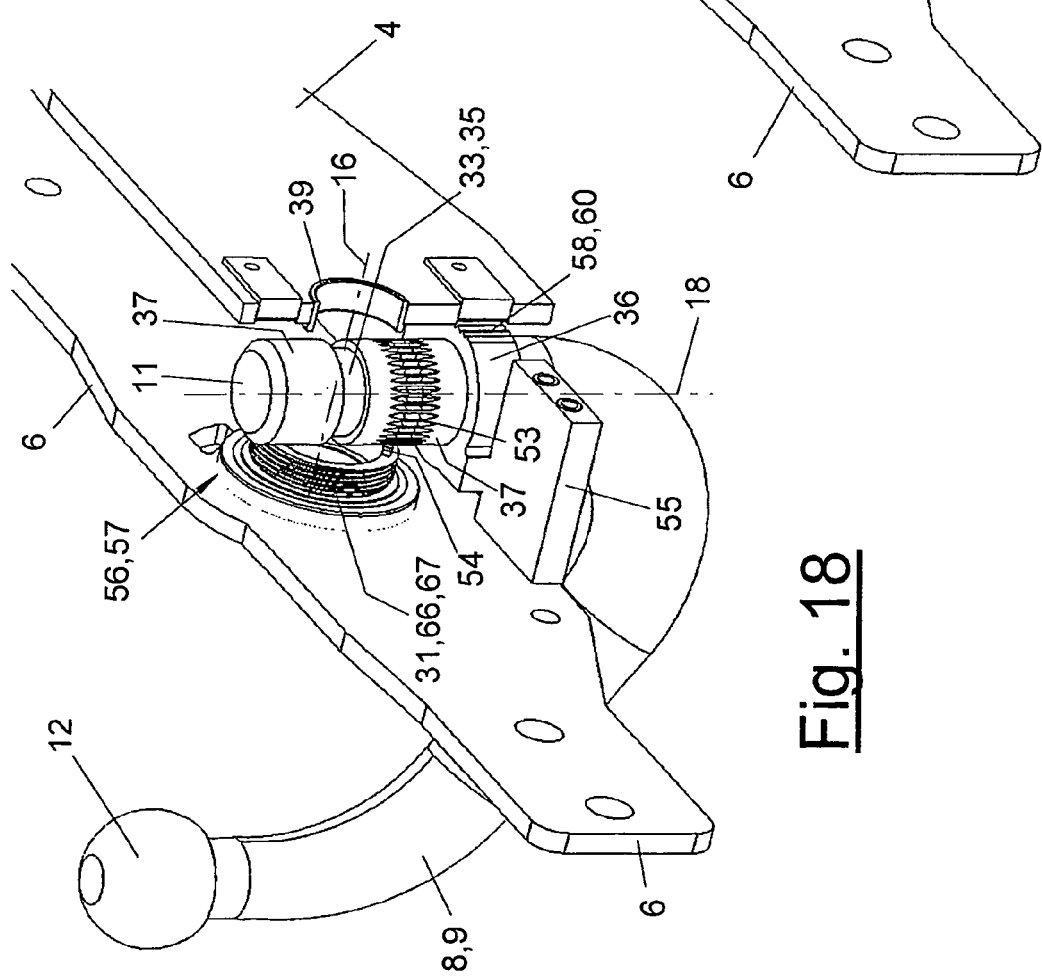

PIVOTABLE TOWING DEVICE FOR TOWING VEHICLES

FIELD OF THE INVENTION

The present invention pertains to a pivotable hitch for towing vehicles with a tow bar mounted movably around at least two rotatory axes and with at least one mechanical drive for moving the tow bar between a operating position and a inoperative position.

BACKGROUND OF THE INVENTION

Such a pivotable hitch is known from DE-A 100 23 640. It comprises a curved tow bar, which is mounted movably around two rotatory axes and is pivoted to and fro by a motor drive between an extended operating position and a withdrawn inoperative position. The rotatory axes are actuated one after another, and the translatory drive first rotates the tow bar by 90° around an axis of rotation extending along the rear end of the bar by means of an eccentric lever for pivoting in from the operating position. The axis of rotation is directed vertically during this rotary movement, and the tow bar is moved during the rotary movement through a cutout necessary for this in the visible area of the rear spoiler of the towing vehicle. Due to the limited kinematics the tow bar cannot move about at the bottom around the edge of the rear spoiler or of the shock absorber and needs the optically disadvantageous cutout, which must be closed with a cover. As soon as the rotary movement comes to an end, a pivoting movement of the tow bar, which is not at right angles, takes place around a tilt axis directed in the longitudinal direction of the vehicle, as a result of which the tow bar disappears behind the rear spoiler and is not visible any longer. This hitch is of a complicated design and requires a complicated control or bar guide to maintain the necessary sequence of movements during the rotation and tilting. The tilting movement may begin only after the conclusion of the rotary movement, because the tow bar would otherwise strike the rear spoiler and damage same.

Another biaxially pivotable hitch is known from DE 195 21 896 A1. The tow bar is mounted pivotably around two rotatory axes that can be actuated one after another and is moved by a mechanical drive between an extended operating position and a withdrawn inoperative position at the towing vehicle. The tow bar is pivoted off from the operating position by means of filigree lifting clips and is subsequently rotated by 90° into a position behind the rear spoiler. The tow bar is visible from the outside in the inoperative position.

Another towing coupling, which has only a single, obliquely directed pivot axis for the movement of the tow bar, is known from EP-A 0 799 732. This arrangement requires a large space for its installation because the pivot axis is located obliquely in space. In addition, the tow bar also requires much free space for movement due to the monoaxial pivoting movement. Both are absent in many vehicles. The range of use is limited as a result.

Another hitch, in which the tow bar is likewise movable around two axes, but the translatory axis and a pivot axis cooperate, is known from DE-A 197 11 535. The drive generates a translatory extending movement from the inoperative position, and the tow bar is brought at the end of the movement into the upright position, which is needed in the extended operating position, by 90° from its initially transverse position by means of a helical crank. This arrangement only makes it possible to linearly withdraw the tow bar and to bring it from its position, in which it projects rearwardly from the rear of the vehicle in the operating position, into a position under the rear spoiler. However, it is not possible here to allow the tow bar to disappear in the inoperative position behind the rear spoiler and to make it invisible.

SUMMARY OF THE INVENTION

The object of the present invention is to provide a better pivotable hitch.

According to the invention, a hitch is provided for towing vehicles. The hitch includes a tow bar mounted movably around at least two rotatory axes. The hitch has at least one mechanical drive for moving the tow bar between an operating position and an inoperative position. The drive has a means for generating a rotary movement of the tow bar, which is superimposed at least in some areas, around or onto both of the axes.

The pivotable hitch according to the present invention has the advantage that the tow bar can be brought from the operating position into an inoperative position, in which it disappears behind the rear spoiler and is no longer visible. The free space needed for the movement of the tow bar is very small due to the superimposed rotary movement. In addition, no visible openings or other changes in the design are needed in the rear part of the towing vehicle, especially at the rear spoiler. The tow bar can be pivoted around the lower edge of the rear spoiler or the shock absorber located there over a three-dimensionally curved path without collision.

The hitch with its mechanism has, moreover, a very compact design and can also be accommodated in very small spaces in the rear of the vehicle. In particular, the depth in the longitudinal direction of the vehicle is small, in the range of 80 mm or less. The hitch has, furthermore, the advantage that the movements can be accurately controlled. In addition, the hitch can make do with a single mechanical drive, e.g., a drive motor or a manual crank drive or the like. This simplifies the design and reduces the costs.

The socket holder may advantageously also be connected with the tow bar and moved together with same. As a result, it is likewise invisible in the inoperative position.

As an alternative, a current transfer means connected with the tow bar may be used.

The superimposed rotary movement around the two axes is preferably embodied by means of a gear mechanism. The drive motor can now be connected with the tow bar and move together with same. This offers the advantage that the space needed for installation can be reduced even more. In addition, the tow bar can be accommodated in the inoperative position in a free space in the cross rail of the towing vehicle, where it is also protected especially well.

To generate the two superimposed rotary movements, the gear mechanism may have two gear mechanism parts that are coupled with one another. These may have different designs, as a result of which the hitch can be adapted to the given space conditions and to different vehicles within broad limits. The prior-art hitches do not offer this flexibility.

The hitch has, furthermore, the advantage that it can be sealed very well from the outside against environmental effects. On the one hand, the housing surrounds the drive, the gear mechanism and the pivot bearing for the tow bar in a water-proof and dust-proof manner. Furthermore, a seal may be present, which sealingly closes the free space in the cross rail and/or the rear opening on the underside of the rear of the vehicle. This seal may be designed as a lip seal in the simplest case but, as an alternative, also as a movable and controllable sealing part, whose movement is derived from the drive or from the pivoting movement of the tow bar.

Furthermore, the hitch may have a locking device, with which the tow bar can be fixed at least in the extended operating position and preferably also in the withdrawn inoperative position. The locking device is actuated and released automatically during the withdrawal and extension of the tow bar.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 5 is a simplified view of the hitches showing a movement position corresponding to FIG. 1, as a view from the rear;

FIG. 6 is a simplified view of the hitches showing a movement position corresponding to FIG. 2, as a view from the rear;

FIG. 7 is a simplified view of the hitches showing a movement position corresponding to FIG. 3, as a view from the rear;

FIG. 8 is a simplified view of the hitches showing a movement position corresponding to FIG. 4, as a view from the rear;

FIG. 18 is another extensively cut-away and abstracted perspective views of the hitch from FIGS. 15 through 17;

FIG. 19 is another extensively cut-away and abstracted perspective views of the hitch from FIGS. 15 through 17;

DESCRIPTION OF THE PREFERRED EMBODIMENTS

Figure 9:
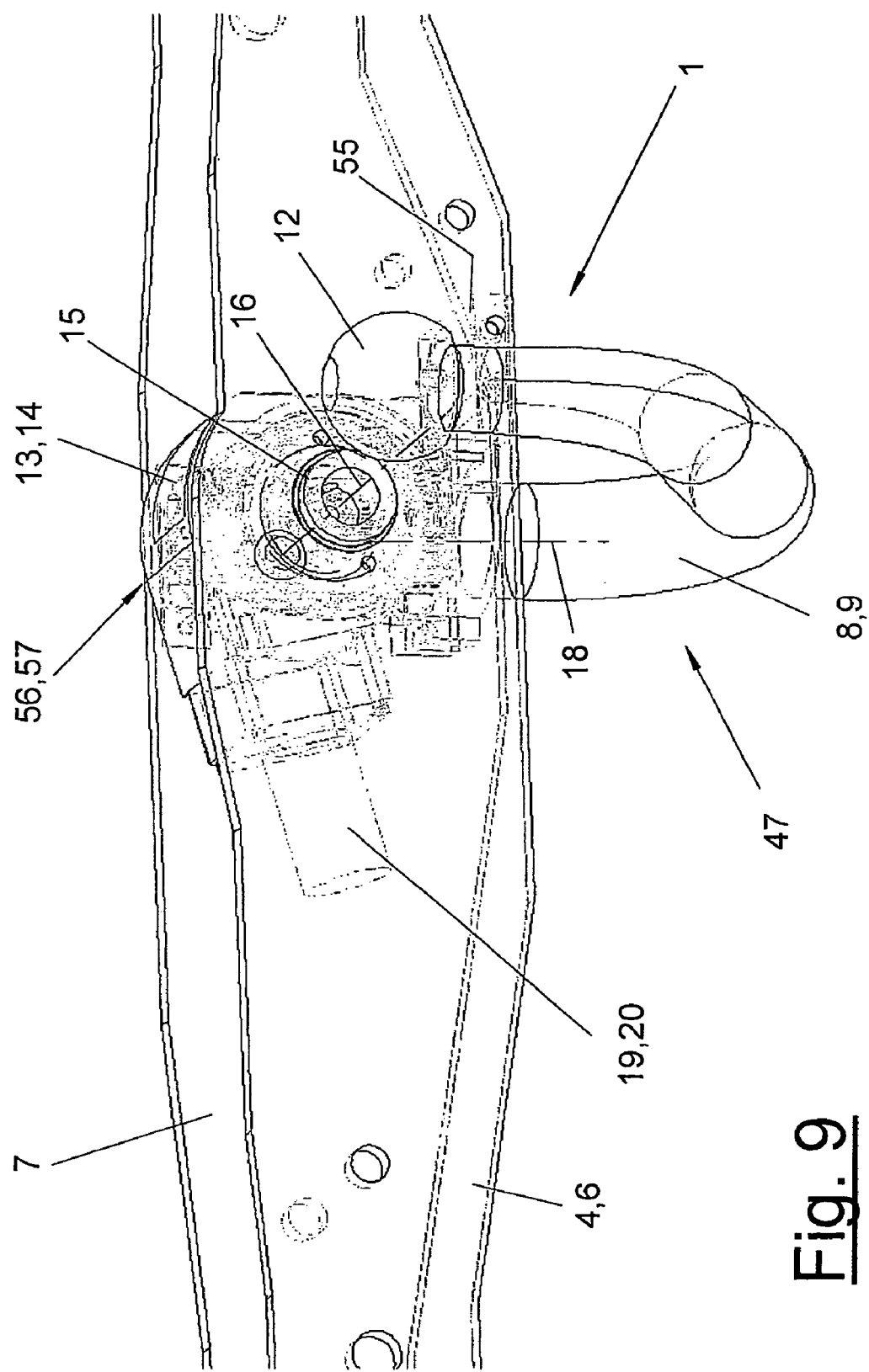
FIG. 9 is a greatly detailed perspective view of the hitches in one of three different movement positions from FIGS. 5 through 8 as a view from the rear.
Figure 10:
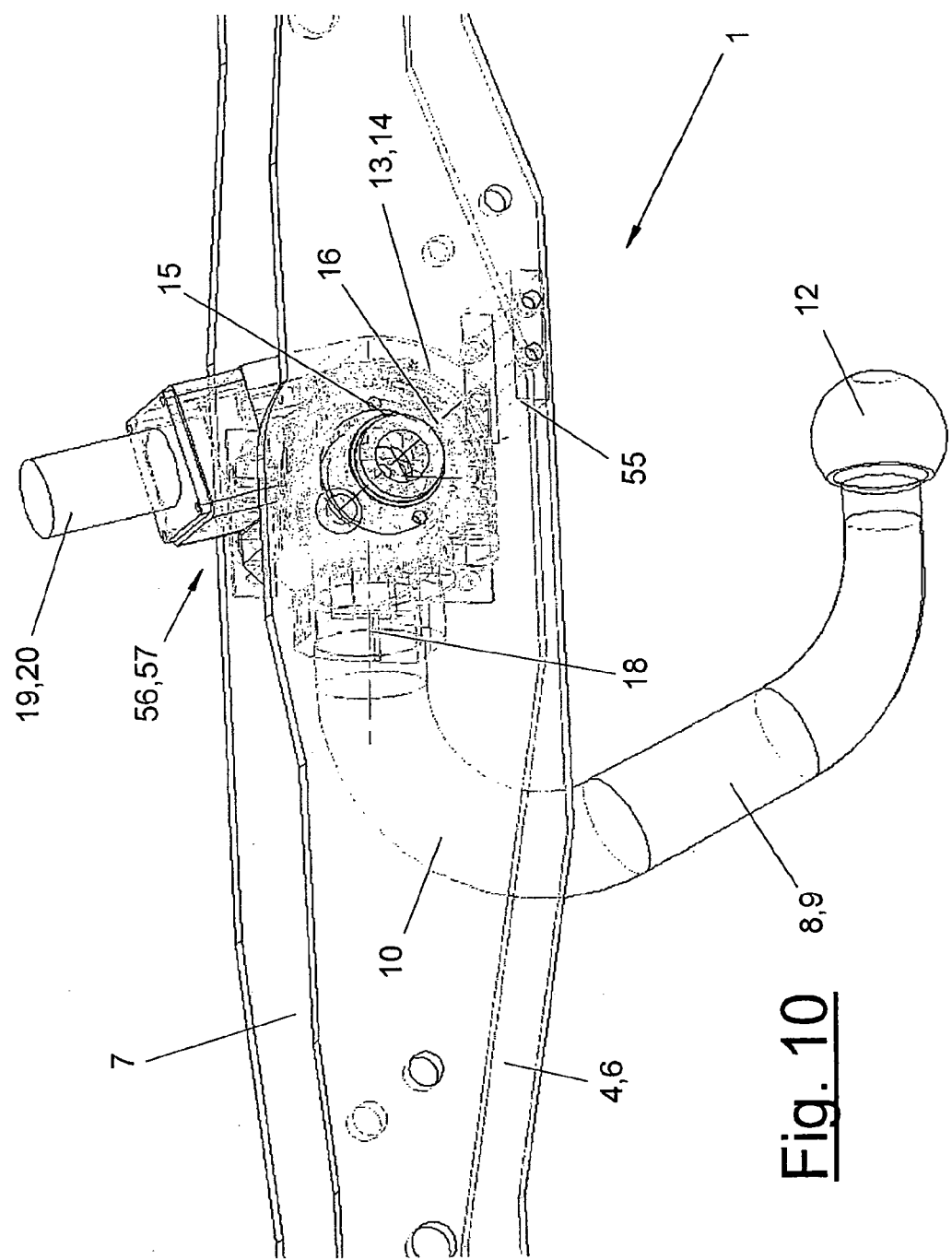
FIG. 10 is a greatly detailed perspective view of the hitches another of three different movement positions from FIGS. 5 through 8 as a view from the rear.
Figure 11:
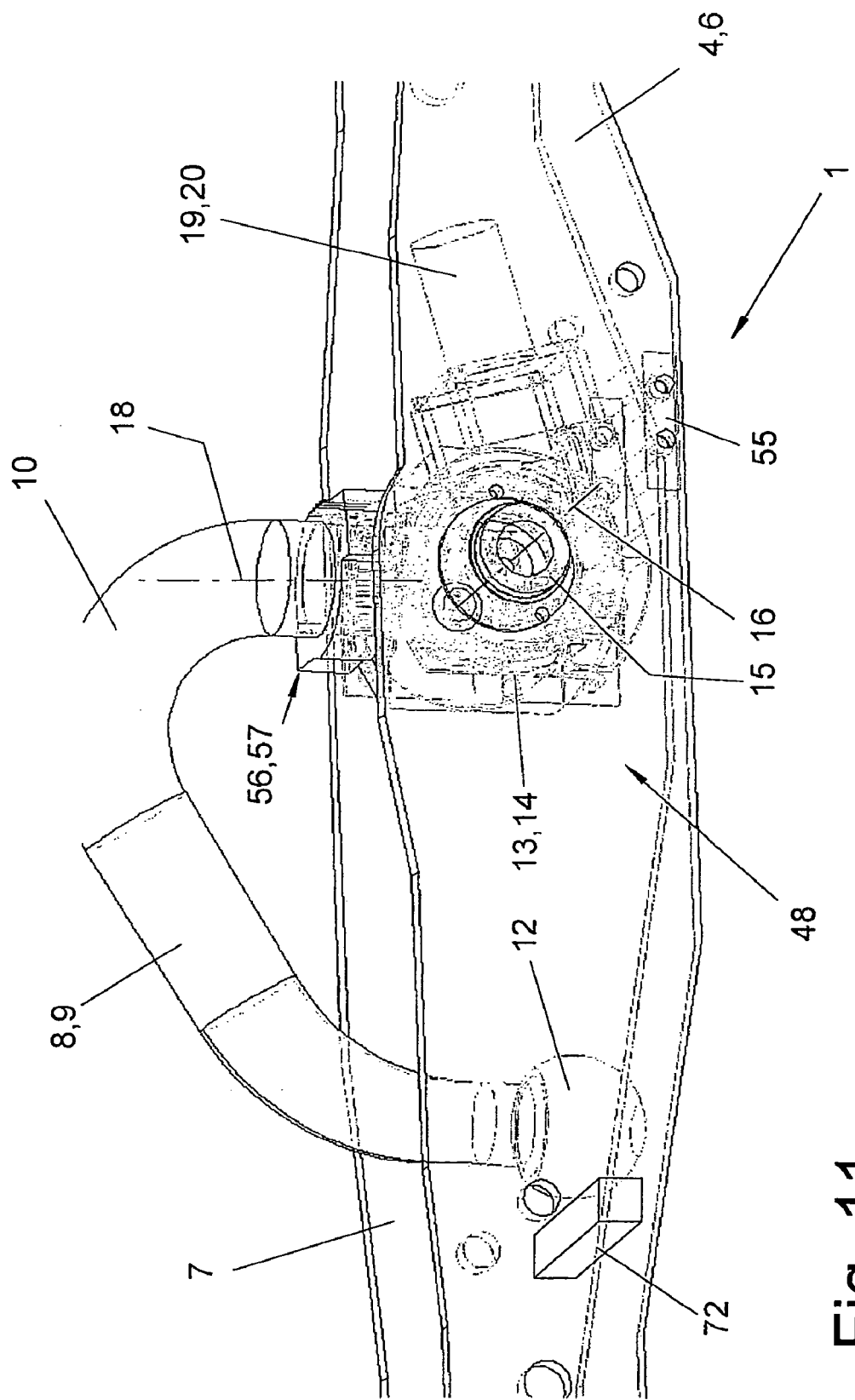
FIG. 11 is a greatly detailed perspective view of the hitches another of three different movement positions from FIGS. 5 through 8 as a view from the rear.

Referring to the drawings in particular, FIGS. 1 through 4 show a cut-away side view and different movement positions of a hitch 1 at the rear 3 of a towing vehicle 2. FIGS. 5 through 8 show for this the corresponding movement positions in a simplified view and in a view from the rear. FIGS. 9 through 11 show more greatly detailed rear views and movement positions.

The hitch 1 is associated with the towing vehicle 2 and is accommodated hidden in a cavity of the rear 3 of the vehicle, which cavity has a rear opening 52 on the underside. The hitch 1 has a tow bar 8, which is preferably bent twice or in an essentially U-shaped pattern and carries a suitable towing head 12, e.g., a usual ball head, at the free, upwardly projecting end of the neck 9 of the bar. The tow bar 8 preferably consists of metal, e.g., steel or light metal. The bar neck 9 passes over after a first curvature 10 into an obliquely rearwardly dropping, straight section and then, via a second curvature 10, into another straight and upright bar end 11.

Figure 1:
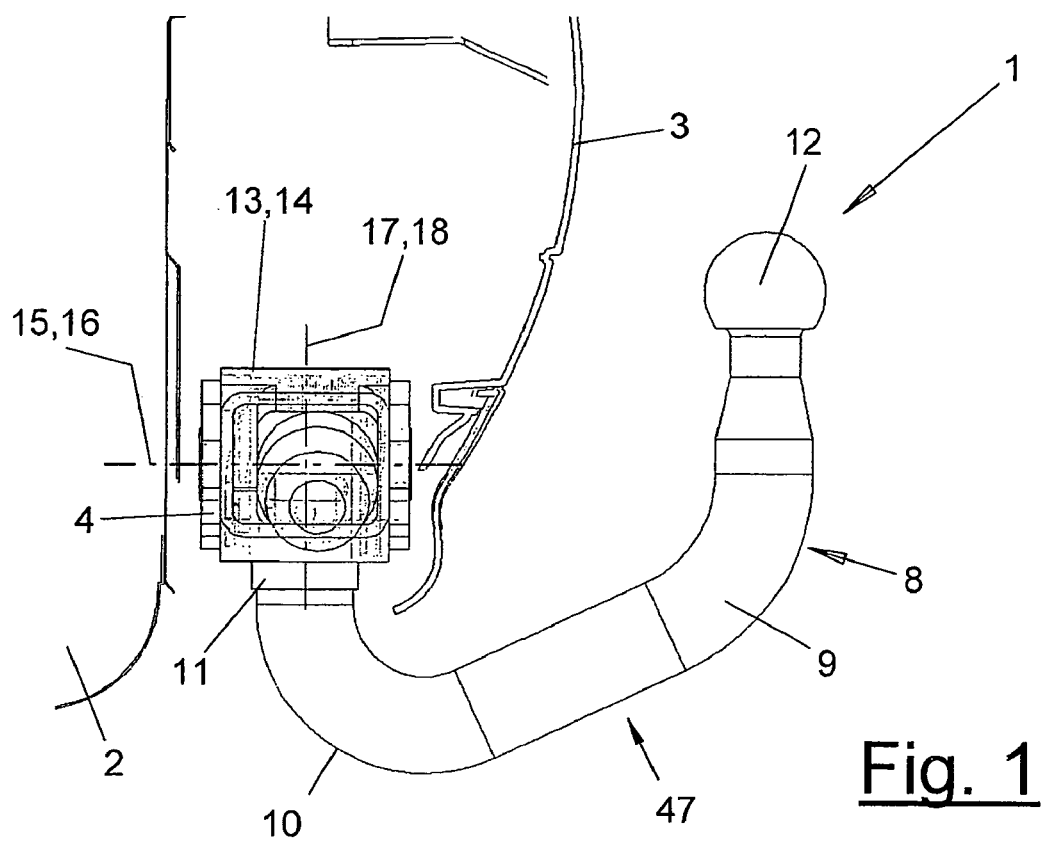
FIG. 1 is a cut-away side view of a hitch with parts of the rear of the vehicle showing a stage of movement between the extended operating position and the withdrawn inoperative position.
Figure 2:
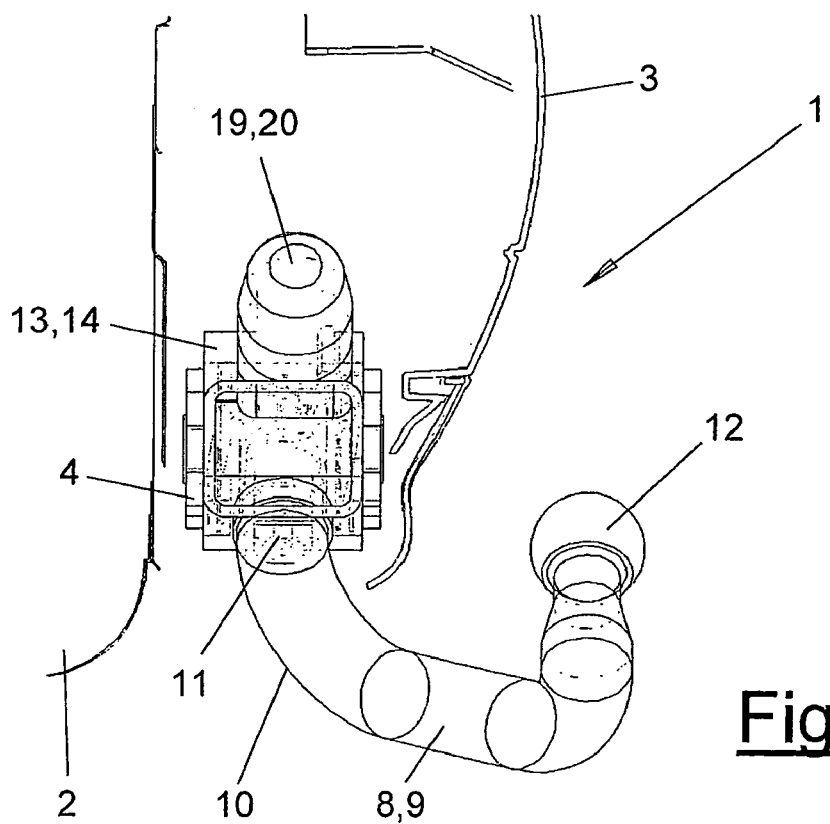
FIG. 2 is a cut-away side view of a hitch with parts of the rear of the vehicle showing another stage of movement between the extended operating position and the withdrawn inoperative position.
Figure 3:
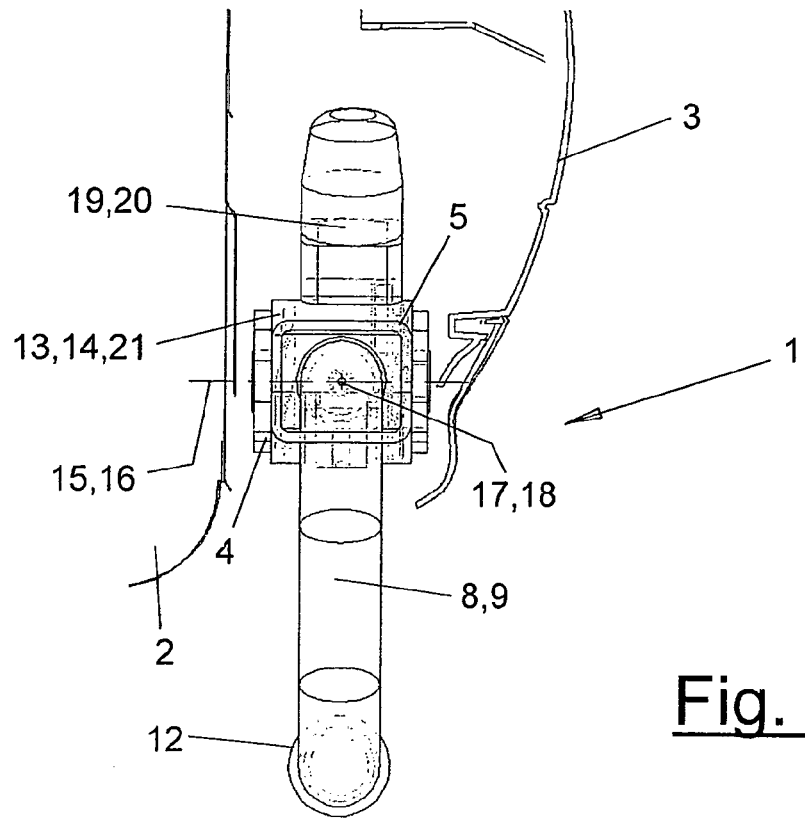
FIG. 3 is a cut-away side view of a hitch with parts of the rear of the vehicle showing another stage of movement between the extended operating position and the withdrawn inoperative position.
Figure 4:
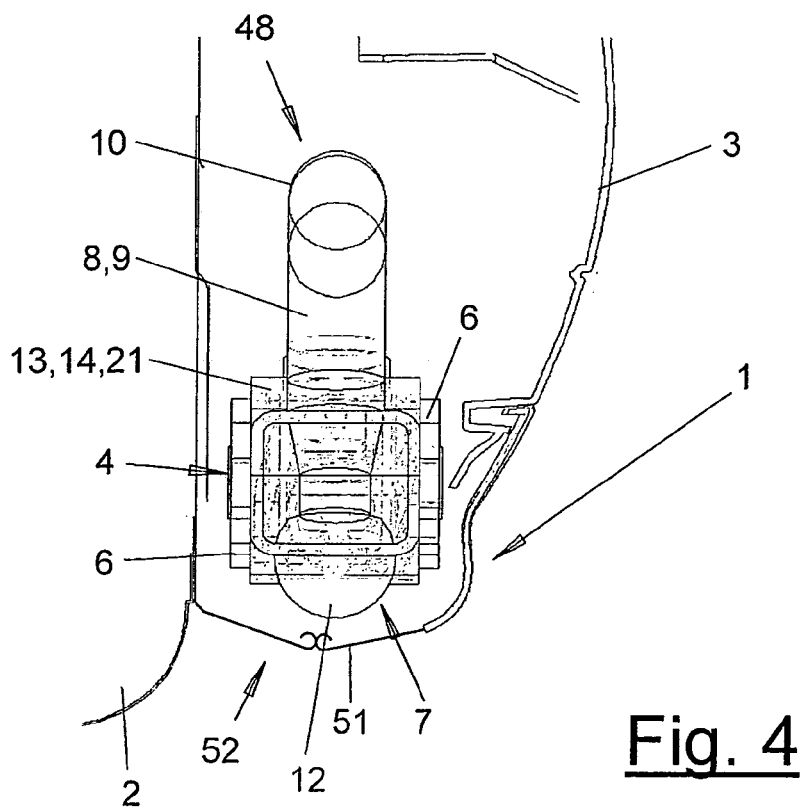
FIG. 4 is a cut-away side view of a hitch with parts of the rear of the vehicle showing another stage of movement between the extended operating position and the withdrawn inoperative position.

FIGS. 1, 5 and 9 show for this the operating position 47, in which the extended tow bar 8 assumes the above-described positions and orientations and is positioned with its ball head 12 ready for coupling at a spaced location in front of the rear spoiler 3. FIGS. 4, 8 and 11 show the withdrawn inoperative position 48 of the tow bar 8.

The tow bar 8 is mounted at least biaxially and preferably cardanically and is moved by a mechanical and preferably motorized drive 13. The drive motor 20 is preferably designed as an electric motor, especially a gear motor. It is supplied with operating voltage from the power supply unit of the towing vehicle 2 via a suitable trailing cable installation. The hitch 1 has, furthermore, a control, not shown, which is equipped with corresponding operating elements for positioning in the towing vehicle 2 or is connected with such operating elements which may possibly already be present in the vehicle. As a result, the hitch 1 can be moved to and fro between its end positions 47, 48, the correct function or also incorrect functions being displayed by control lights or the like. The control may be actuated from the interior space of the vehicle, but, as an alternative, also from the outside via a preferably wireless remote control via radio, infrared light or the like.

Figure 26:
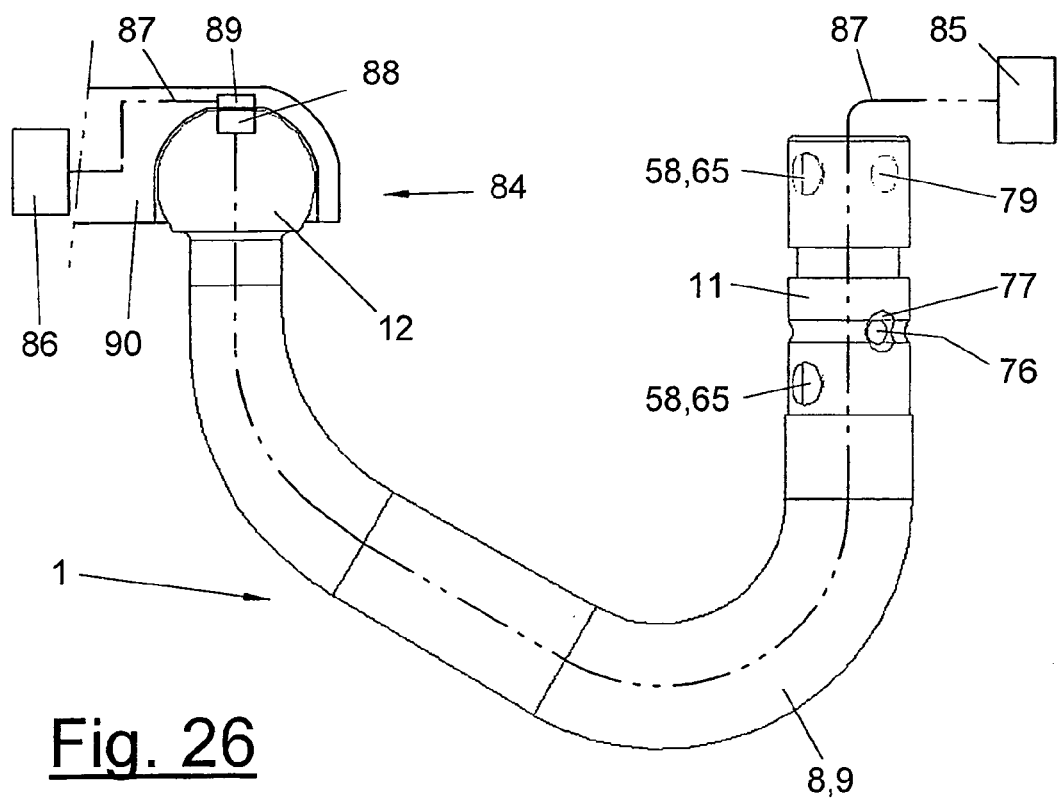
FIG. 26 is a side view of the tow bar from FIGS. 20 through 24 with a current transfer means.

The trailing cable installation may be connected, moreover, with an electric socket 43 for the power supply of a towed vehicle and supply it with the necessary operating voltage and signal or control voltages. The socket 43 is associated with the tow bar 8 and can be moved with same. The said currents or voltages can be switched off at the socket 43 in the inoperative position 48 and switched on in the operating position 47 via the central control of the hitch 1. FIG. 26 shows a variant for this, which will be described below, with a current transfer means 84.

The hitch 1 has, furthermore, a locking device 56, with which the tow bar 8 can be locked and fixed by locking elements 58, 59, 78 in a positive-locking manner in at least one of its end positions, preferably in both end positions 47, 48. The drive 13 is relieved as a result.

The rearward bar end 11 is mounted rotatably around a central axis of rotation 18 by means of a pivot bearing 17 in a housing 19. The housing 19 is mounted in turn at a cross rail 4 in the rear area 3 of the towing vehicle 2 via a pivot axis 16 directed at right angles to the axis of rotation 18 and a corresponding drag bearing 15. The axes of rotation 16, 18 are preferably directed at right angles to one another in the manner of a cardanic mount and intersect. The pivot axis 16 preferably extends in the direction of the longitudinal axis of the towing vehicle. The cross rail 4 may be part of the hitch 1. However, it may also be present on the towing vehicle. The socket 43 is preferably fastened to the housing 19 with a plate- or web-shaped socket holder 44.

As is illustrated in FIGS. 1 through 11, the tow bar 8 can be moved thanks to the cardanic mount from the operating position 47 shown in FIGS. 1, 5 and 9 into a withdrawn inoperative position 48 shown in FIGS. 4, 8 and 11. FIGS. 2, 3, 6, 7 and 10 show the intermediate positions assumed in this process. The tow bar 8 performs here a superimposed rotary movement around both rotary axes 16, 18, which movement is simultaneous at least in some areas. The tow bar 8 rotates around its axis of rotation 18 at the bar end 11 preferably by 90°, and it is moved by a greater angle of, e.g., 180° to 190° around the pivot axis 16 by means of the pivoting movement of the housing 19.

The tow bar 8, curved twice, now moves with its ball head 12 in a rather short path under the lower end of the rear spoiler 3 and can dip into the cavity 7 behind the rear spoiler 3 at the end. Nothing can be seen of the tow bar 8 and the socket 43 moved along with it from the outside in the inoperative position 48 in this preferred embodiment. The parts are completely hidden behind the rear spoiler 3. The tow bar 8 now assumes in the inoperative position 48 a position which is directed at right angles to the longitudinal axis of the vehicle and in which it points upward with its curvatures 10.

The pivoting movements of the tow bar 8 can be limited in the two end positions 47, 48 by relatively stationary stops 55, 72 at the cross rail 4. A stop 55, which is struck by the tow bar 8 with a projection arranged under the housing 19 at a shoulder 36 of the tow bar, is active for the extended operating position 47. The ball head 12 comes into contact with a stop 72 located transversely in the inoperative position 48. FIG. 11 shows both stops 55, 72.

As is illustrated in FIG. 4, the hitch 1 has at least one seal 51, which is arranged on the underside of the cross rail 4 and/or at the rear spoiler 3. The seal 51 can close downward the free space 7 described in greater detail below at least in the inoperative position 48 of the tow bar 8. It may comprise, e.g., a lip seal or a slide which is connected with the tow bar 8 and can be moved to and fro at the rear opening or another design. As a result, the components of the hitch 1 are accommodated protected in the cavity of the rear 3 of the vehicle and, on the other hand, protective caps or other covers of the ball head 12 can be dispensed with. The protective arrangement is also advantageous for the current transfer means 84.

The mechanical drive 13 has a means 14 for generating the superimposed rotary movement of the tow bar 8 around the two rotatory axes 16, 18. The means 14 is preferably designed as a multipart gear mechanism 21, which comprises a pivoting gear mechanism 22 and a rotating gear mechanism 23.

The cross rail 4 has, preferably in the middle area, where the hitch 1 is usually positioned at the towing vehicle 2, a longitudinally extending free space 7, into which the tow bar 8 with the housing 19 as well as the socket can move, and the housing 19 may be mounted pivotably at the walls surrounding the free space 7. The cross rail 4 comprises for this purpose, for example, two support tubes 5 or other suitable carrier elements, which are directed at right angles to the longitudinal axis of the vehicle and are located at laterally spaced locations from one another in the longitudinal direction of the vehicle in the middle area of the vehicle, forming the free space 7. The free space 7 is limited laterally by two parallel support plates 6, which are fastened, e.g., welded at their ends to the two support tubes 5. The support plates 6 form in the middle a drag bearing part 39, which is designed, e.g., as a bearing eye, by the second, pin-like drag bearing parts 38 connected with the housing 19 being mounted and guided rotatably and optionally displaceably in conjunction with the locking device 56.

The drive motor 20 is connected with the tow bar 8 and arranged at the housing 19 in the exemplary embodiments shown. It moves together with the movements of the bar and the housing. These changes in position are illustrated in FIGS. 1 through 11.

The means 14 for generating the superimposed rotary movements is preferably designed as the above-mentioned two-part gear mechanism 21, which couples the rotatory axes 16, 18. One gear mechanism part is designed as a pivoting gear mechanism 22 and acts on the pivot axis 16. The other gear mechanism part is designed as a rotating gear mechanism 23 and acts on the axis of rotation 18. The gear mechanism parts 22, 23 are coupled with one another in terms of their movements, the rotary movement around the axis of rotation 18 being preferably derived from the pivoting movement around the pivot axis 16, which said pivoting movement is greater in this exemplary embodiment. In the manner to be described below, the drive motor 20 at first generates the pivoting movement of the housing 19 with the tow bar 8 mounted therein around the pivot axis 16, from which the rotary movement of the tow bar 8 around the axis of rotation 18 is then derived.

The means 14 for generating the superimposed rotary movement has a plurality of design variants according to FIGS. 12 and 14, 15 through 19 and 20 through 29, which differ concerning the design of the gear mechanism 21.

Figure 12:
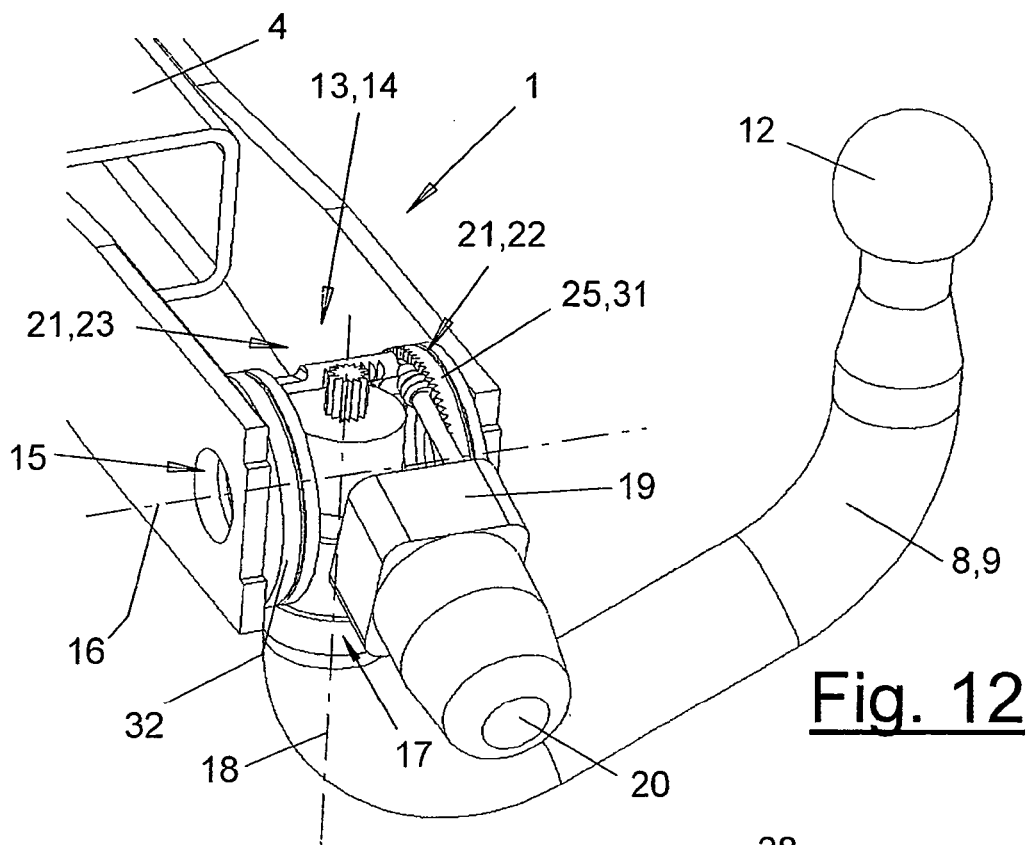
FIG. 12 is a perspective and cut-away view of a first variant of the drive of the hitch.

As is illustrated in FIG. 12, the rotatingly driving drive motor 20 is flanged to the end of the housing 19 in all variants. It is connected with a drive element 24 of the pivoting gear mechanism 22, which is designed, e.g., as a worm shaft and engages a relatively stationary support element 25. This is, e.g., an annular toothed ring 25 shown in FIGS. 12, 16 and 20, which is fastened to the adjacent support plate 6 temporarily stationarily if a locking device 56 is present. The toothed ring 25 and the congruent support ring 31 are arranged here concentrically with the pivot axis 16 and have on the inner side a circular passage opening fore the bearing journal 38 of the drag bearing 15 at the housing 19. The toothed ring 25 is preferably arranged on the side of the cross rail 4 facing the rear 3 of the vehicle. The arrangement may alternatively also be reversed. The toothed ring 25 and the support ring 31 may be connected with one another and made in one piece with one another. The worm gear set tangentially meshes with the inwardly directed toothed ring 25. By rotating the worm shaft 24, the drive motor 20 with the housing 19 flanged thereto moves in the desired direction to the left or right around the pivot axis 16.

Figure 13:
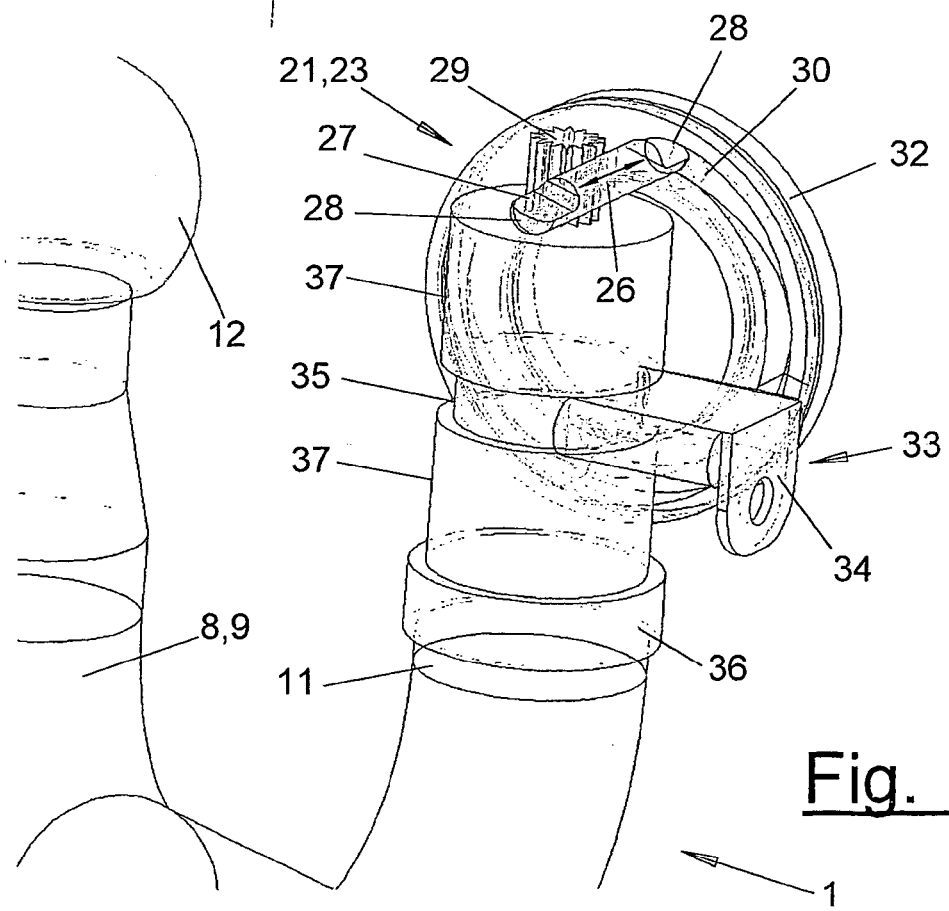
FIG. 13 is a perspective detail view of the drive from FIG. 12.
Figure 14:
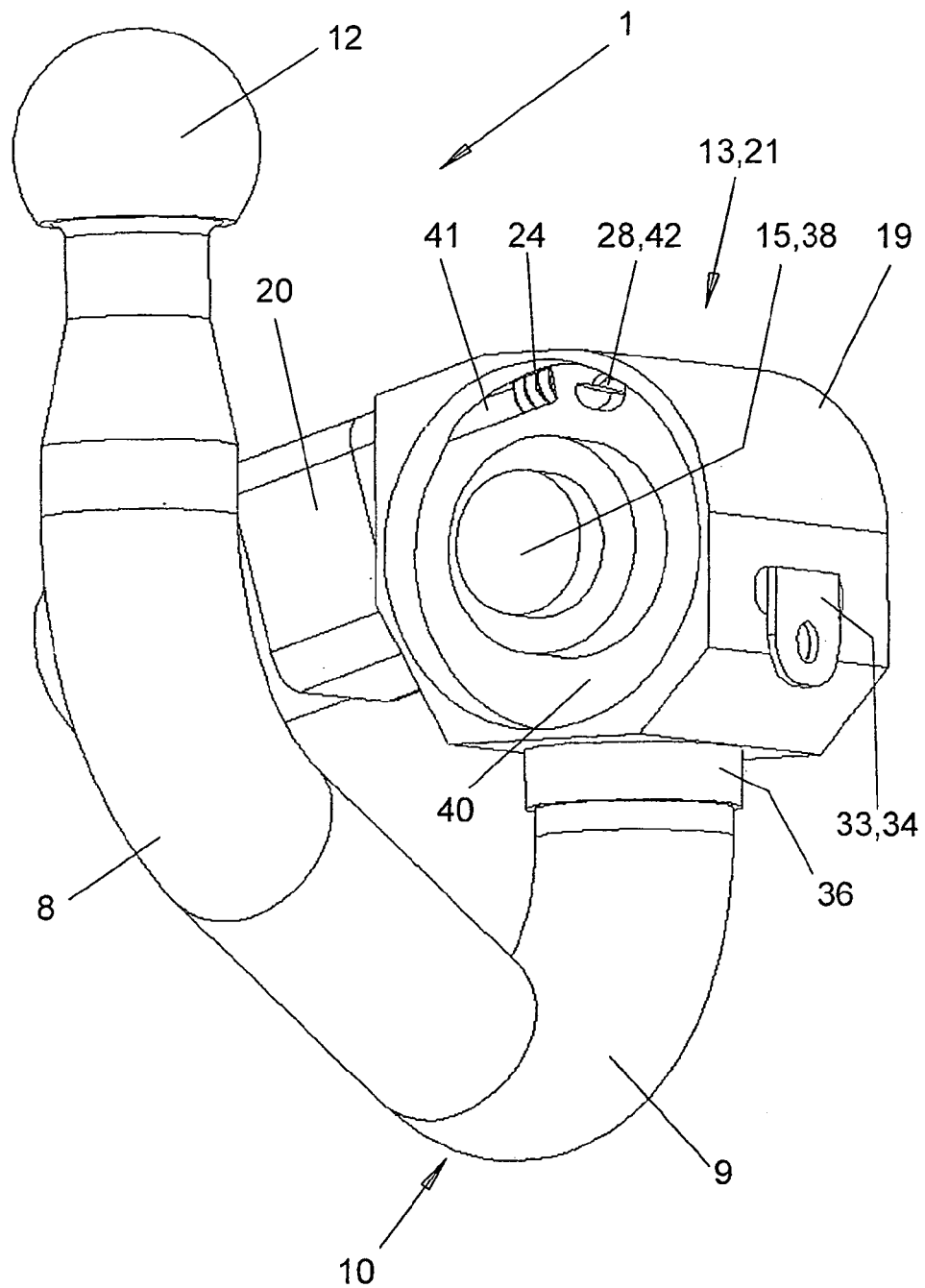
FIG. 14 is a perspective view of the hitch and drive.
Figure 15:
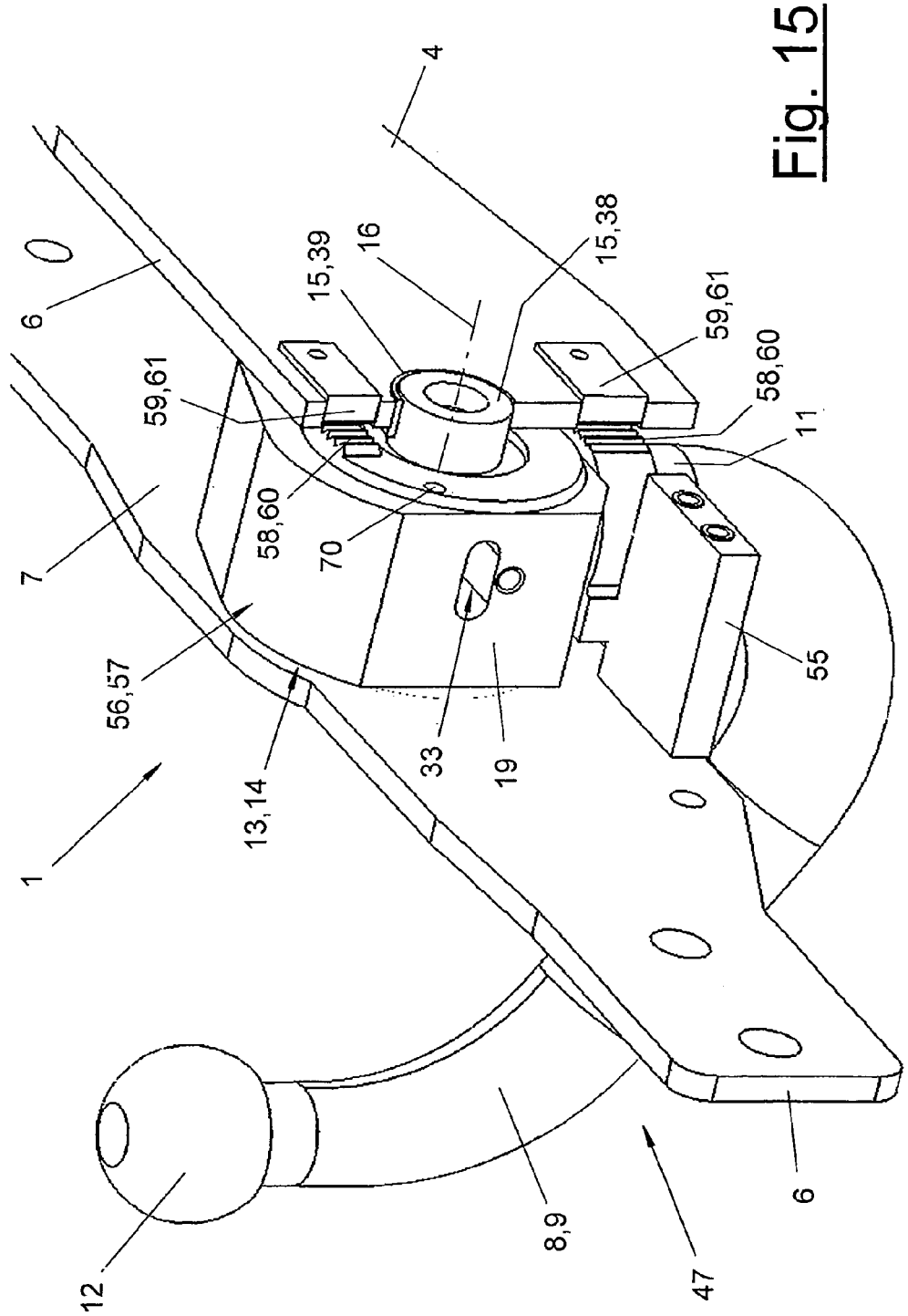
FIG. 15 is a partially cut-away perspective view of a second variant of the drive of the hitch in the installation situation at the rear of the vehicle.

FIGS. 12 through 14 show a first variant of the means 14 for generating the superimposed rotary movement.

The rotating gear mechanism 23, which comprises a transversely movable toothed rack 26, which is directed at right angles to the worm shaft 24 and in the direction of the pivot axis 16, and a gear 29 fastened to the bar end 11, is arranged in the housing 19. On a longitudinal side, the toothed rack 26 is provided with teeth, which mesh with the gear 29. The toothed rack 26 is guided transversely movably in the housing 19 and is mounted such that it is secured against rotation. It is moved together with the tow bar 8 during the pivoting movement of the housing 19 and is guided at one or both ends 28 of the toothed rack at one or two stationary lateral curved paths 30. Furthermore, guides or flattened areas 27, which guide the toothed rack 26 at the housing 19 in openings 42, prevent the undesired rotary movement of the toothed rack 26 around its longitudinal axis and secure the engagement with the gear 29.

Two curved paths 30, which are located opposite each other, are arranged concentrically with the pivot axis 16 and have mutually complementary elevations and depressions on their curved paths, are preferably present. These peaks and valleys are directed in the direction of the pivot axis 16, so that corresponding to the rotated position of the housing 19, the toothed rack 26 is displaced transversely to the left or right due to guiding along the curved paths 30 corresponding to the height contours of the curved paths. The transverse movements of the toothed rack 26 are transmitted to the gear 29 and converted into a rotary movement of the tow bar 8 around the axis of rotation 18 moving together with the pivoting movement of the housing. The superimposition of the pivoting and rotary movements can be influenced by the shaping of the curved paths 30 and their height contour.

As soon as the tow bar 8 has been rotated by 90° and is directed in parallel to the cross rail 4, the rotary movement ends due to a corresponding flattened area of the curved path 30, so that the drive motor 20 will now bring about only a further pivoting movement of the housing 19 together with the tow bar 8 into the inoperative position 48. The tow bar 8 now dips into the free space 7 of the cross rail 4 and is accommodated herein in a protected manner. The socket 43 is also moved along through the free space 7 during this pivoting movement and disappears from the field of view at the rear 3 of the vehicle.

The above-described movements take place in the reversed order when the tow bar 8 is extended from the inoperative position 48 into the operating position 47. The drive motor 20 pivots back the housing 19, and the toothed rack 26 is not moved along at first due to the constant height position of the curved paths 30. The translatory movement of the toothed rack and the corresponding rotary movement of the tow bar 8 will then begin starting from the designed superimposition point.

The cardanic mounting of the tow bar 8, which was mentioned at the beginning, comprises the drag bearing 15 of the housing 19 and the pivot bearing 17 of the tow bar 8 in the housing 19. To form the pivot bearing 17, the bar end 11 has two pivot bearing surfaces 37, which are offset from one another axially due to a securing groove 35 and cooperate with corresponding opposing bearing surfaces in the interior of the housing 19 not shown. The pivot bearing 17 must support the tensile forces acting on the towed vehicle and has a correspondingly stable design. It may contain a sliding bearing or a roller bearing.

An axial securing means 33 is provided to secure the position of the bar end 11. It comprises a securing strap 34, which is guided transversely displaceably in the housing 19 and engages the securing groove 35 on the inner side in a positive-locking manner and axially supports the tow bar 8 as a result. On the outside, the securing strap 34 projects out of the housing 19 with a clip and can be moved, furthermore, to and fro. As a result, the tow bar 8 can be removed if necessary. A projecting shoulder of the bar, with which the bar end 11 is guided on the underside of the housing 19, is also provided under the pivot bearing surfaces 37.

The drag bearing 15 of the housing 19 is formed by the above-mentioned bearing journals 38 in cooperation with the bearing eye 39 arranged at the support plates 6. Concentrically with the bearing journals 15, the housing 19 has, on both outer sides, an annular groove, which forms an additional guide part 40. The annular grooves 40 provided on both sides are engaged, on the one hand, by the stationary toothed ring 25 with one support ring 31 and, on the opposite side, by the other support ring 32. The above-mentioned openings 42 for the toothed rack ends 28 are also arranged at the bottom of the annular groove 40, and the toothed rack ends 28 come into contact as a result with the inner curved paths 30 of the support rings 31, 32. In addition, another opening 42 for the worm shaft 24, which can mesh with the stationary toothed ring 25 as a result, is also located at the bottom of the annular groove 40. FIG. 14 shows this design of the housing.

FIG. 14 shows, furthermore, that the housing 19 sealingly surrounds the components located on the inside, such as the drive motor 20, the gear mechanism 21 and the gear mechanism parts 22, 23 and the pivot bearing 17, and seals them against the entry of moisture, dust or other environmental factors. The support rings 31, 32 may have grooves for this purpose on their circumference for receiving sealing rings or the like, which are in contact on the outer side with the jacket of the pot-shaped guide part 40 of the housing 19. As a result, the openings 41, 42 are sealed as well.

FIGS. 15 through 19 show a second variant of the drive 13 and the gear mechanism 21, which are also shown in FIGS. 9 through 11.

Figure 16:
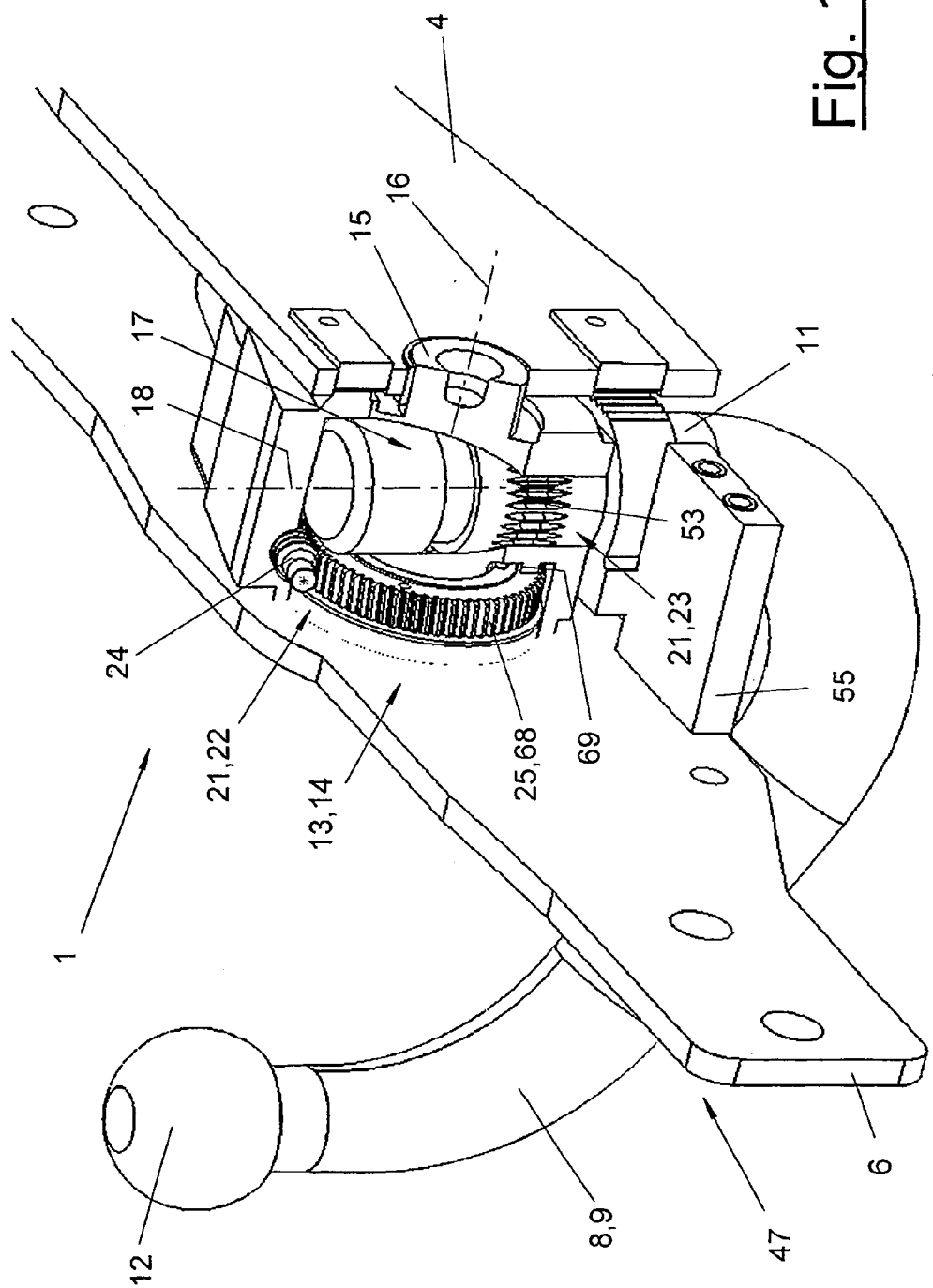
FIG. 16 is an even more extensively cut-away view of the hitch according to FIG. 15.
Figure 17:
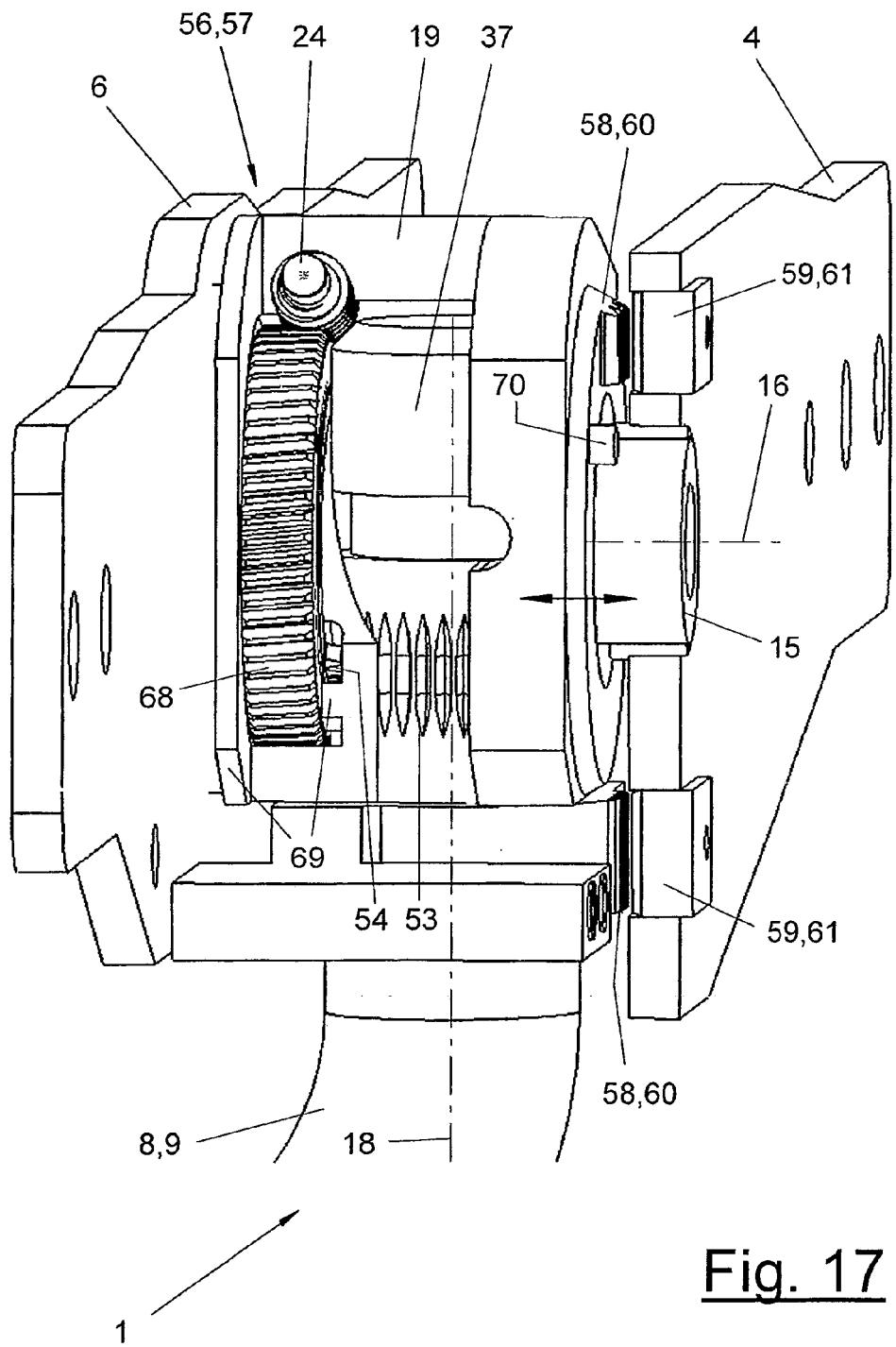
FIG. 17 is another cut-way perspective detail view of the hitch according to FIG. 16.

The relatively stationary support element 25 is a gear 68 shown in FIGS. 16 and 17, preferably a worm gear, which is fastened on a support ring 31 temporarily stationarily at the adjacent support plate 6. The gear 68 is also part of the locking device 56. The gear 68 is mounted and held stationarily and in a relatively fixed position on the support ring 31 during the normal pivoting movements of the toothed rack 26 between its end positions 47, 48. The worm shaft 24 set tangentially meshes with the gear 68, which has external teeth. Rotation of the worm shaft 24 brings about a movement of the drive motor 20 with the housing 19 flanged to it to the left or right in the desired direction of rotation around the pivot axis 16.

The rigid connection between the support ring 31 and the gear 68 can be released for the locking function, and the gear 68 now rotates in relation to the support ring 31 and optionally also performs additionally a translatory movement directed in the direction of the axis 16 toward the front side of the vehicle. This will be discussed later.

The rotating gear mechanism 23, which comprises a toothed ring 53 arranged circumferentially at the bar end 11 and a toothed quadrant 54 concentric with the pivot axis 16 on the front side of the relatively stationary support ring 31, is arranged in the housing 19. This arrangement can be seen in FIGS. 16 and 17. The rotary mounting of the bar end 11 is the same as in the first variant according to FIGS. 12 through 14, the two pivot bearing surfaces 37 being arranged on both sides of the toothed ring 53. The housing 19 has a circular arc-shaped opening in the area of the toothed quadrant 54, through which the toothed quadrant 54 can extend and mesh with the toothed ring 53.

When the housing 19 with the tow bar 8 mounted therein pivots around the pivot axis 16, the toothed ring 53 rolls on the toothed quadrant 54, as a result of which the tow bar 8 is rotated around the axis of rotation 18. The toothed quadrant 54 and the toothed ring 53 may have an arrangement and design of the teeth that are suitable for this and are coordinated with the desired superimposition of the rotary and pivoting movements. This applies, on the one hand, to the transmission ratio of the teeth and, on the other hand, also to the arrangement and the length of the toothed quadrant 54. As soon as the tow bar 8 dips into the free space 7 of the cross rail 4, the toothed ring 53 becomes disengaged from the toothed quadrant 54, so that the rotary movement is terminated and the tow bar 8 is only pivoted around the pivot axis 16 into the inoperative position 48. The angular position of the toothed quadrant 54 is selected correspondingly relative to the pivot axis 16. When the tow bar 8 is extended from the inoperative position 48 into the operating position 47, the above-described movements take place in the reverse order.

FIGS. 20 through 29 show the third variant of the drive 13 and of the gear mechanism 21.

Figure 27:
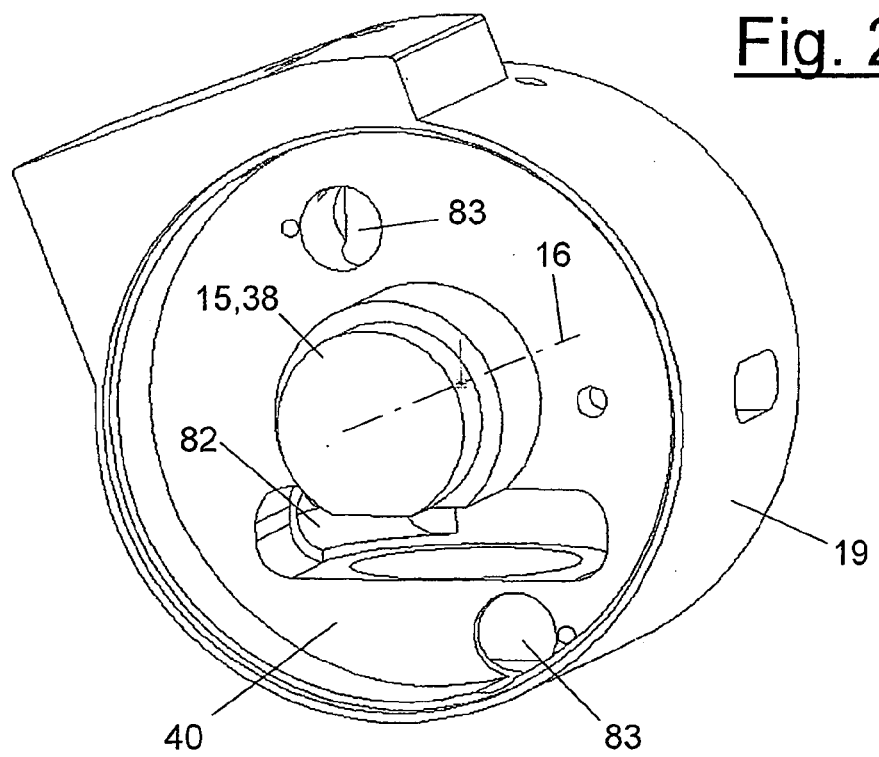
FIG. 27 is a perspective side view of the housing for the drive variant from FIGS. 20 through 24.
Figure 28:
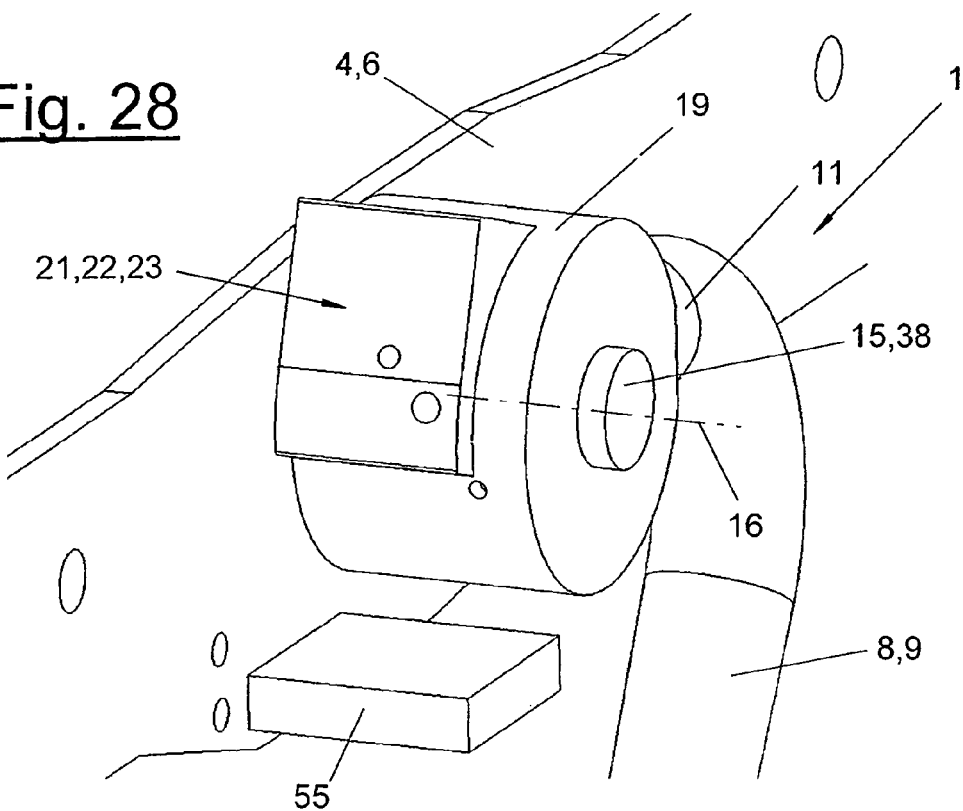
FIG. 28 is a partially cut-away perspective view of the drive in the assembly situation.
Figure 29:
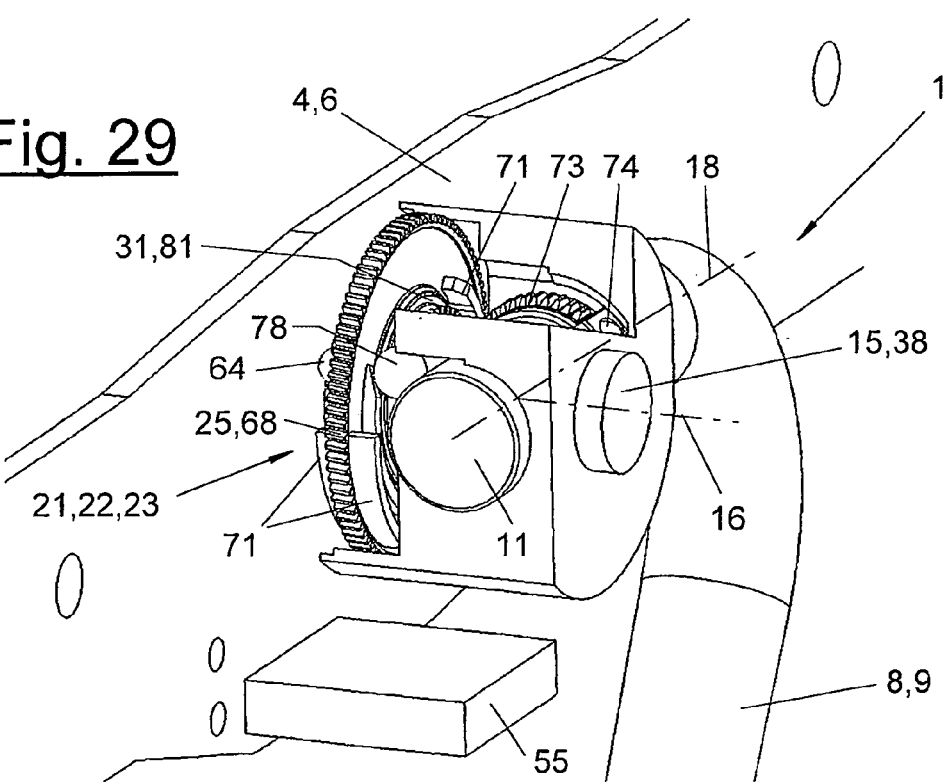
FIG. 29 is a partially cut-away perspective view of the drive in the assembly situation.

There is a continuous meshing of the teeth in the rotating gear mechanism 23 in this third variant. The pivoting gear mechanism 22 with the relatively stationary support element 25 or the gear 68 corresponds to the design of the above-described second variant from FIGS. 15 through 19. The housing 19 and the drive 13 are therefore not shown in FIGS. 20 through 23 for the sake of clarity. The design of the housing is shown in FIGS. 27 through 29.

The rotating gear mechanism 23 is formed in the third variant by an annular toothed ring 81 arranged on the front side of the support ring 31, which is a rigid part of the support, and a toothed ring 73 on the bar end 11. The toothed ring 73 is mounted rotatably on the bar end 11 around the axis of rotation 18 and is guided in the axial direction. The rotary movement is controlled by a locking element 74, which is preferably designed as a ball, which is accommodated in a ball nest 75 at the toothed ring 73. The ball 74 can perform as a result only radial displacing movements in relation to the axis of rotation 18. The ball 74 cooperates with a locking opening 76 at the bar end 11, which said opening blocks the rotary movement of the toothed ring 73 when engaging the ball 74 and establishes a rotatingly locked connection between the tow bar 8 and the toothed ring 73. The angular position of the locking opening 76 in relation to the axis of rotation 18 or the central plane of the bent tow bar 8 is selected to be such that the rotary locking takes place when the two bar 8 is pivoted out after a pivoting movement of about 90° and in an operating position according to FIGS. 3, 10 and 21.

Figure 22:
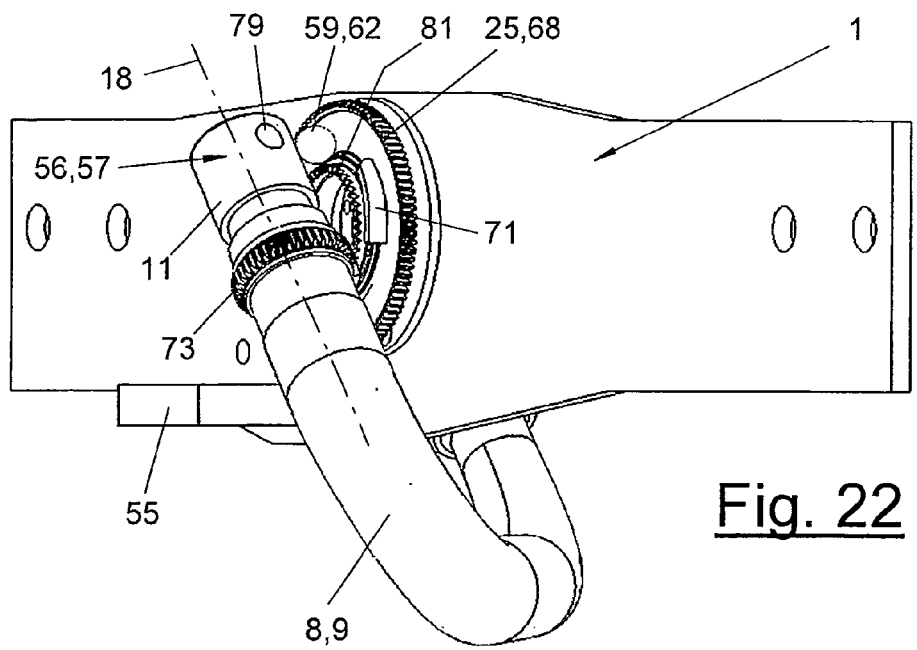
FIGS. 22 and 23 each show a cut-away perspective view of a third variant of the hitch in another of different movement positions.
Figure 23:
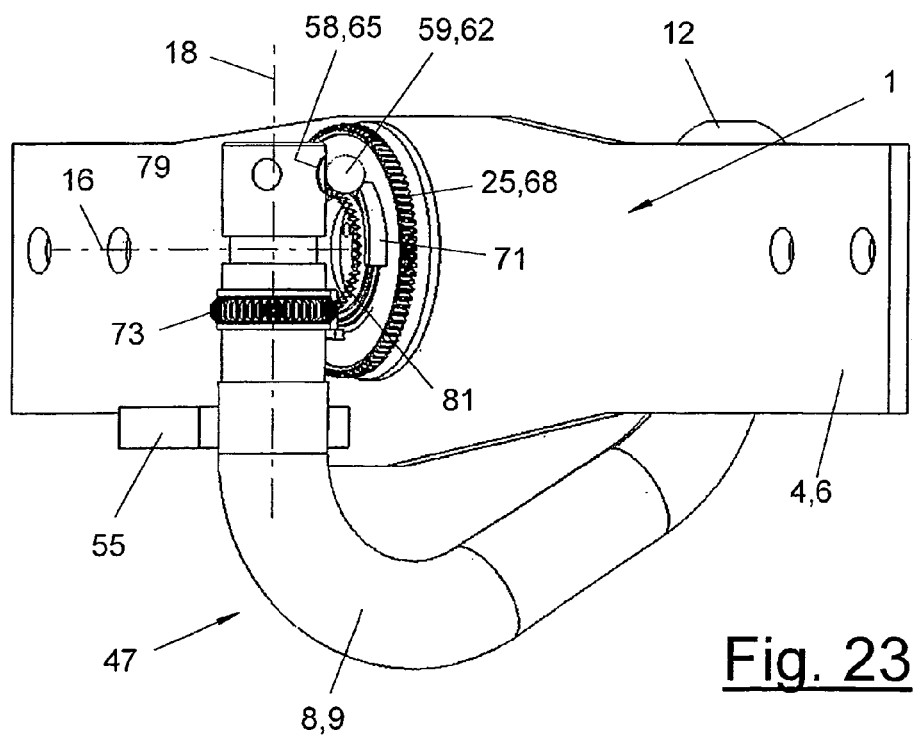
Figure 24:
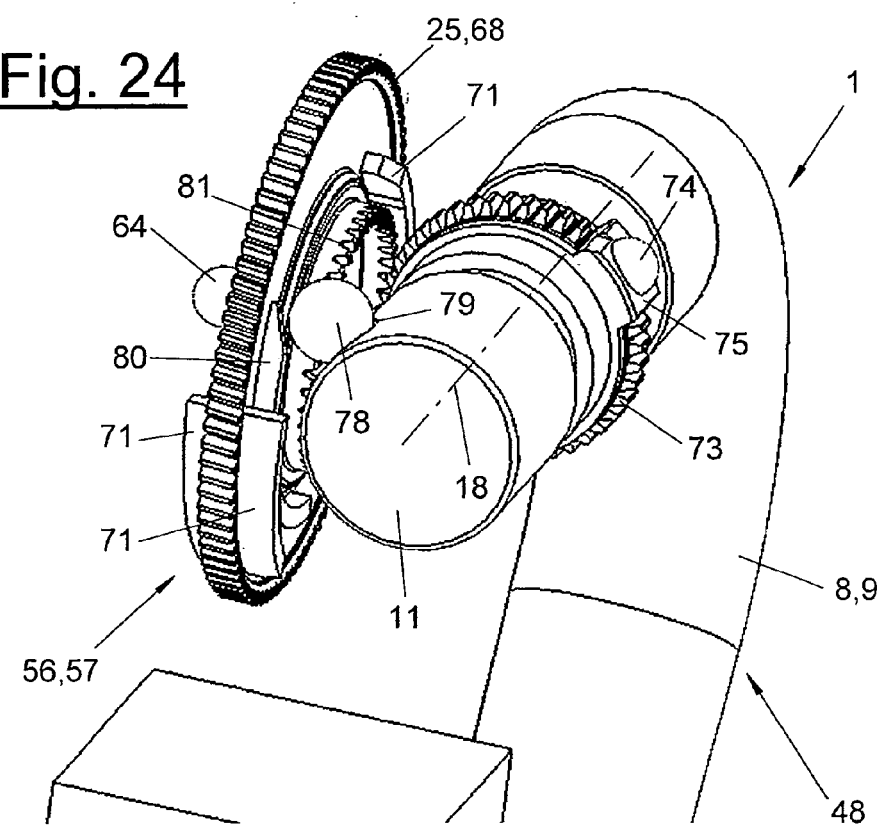
FIG. 24 is an enlarged perspective detail view of the bar end in the locked inoperative position.
Figure 25:
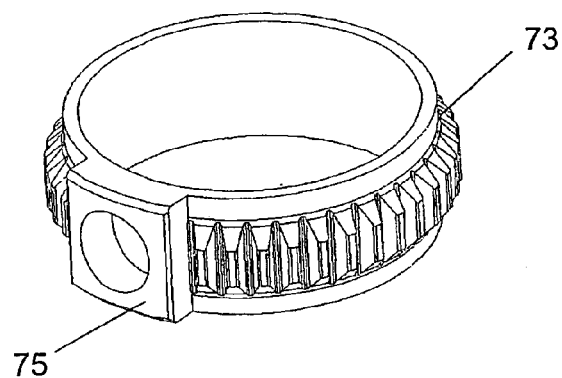
FIG. 25 is an enlarged perspective detail view of a toothed ring.

When the housing 19 begins its pivoting movement from the inoperative position 48 and carries the tow bar 8 with it, the toothed ring 73 rolls on the toothed ring 81 and rotates around the axis of rotation 18 on the bar end 11 without an appreciable resistance. As a result, no rotary force transmission takes place, and the tow bar 8 at first maintains its position in which it is directed in parallel to the cross rail 4. After a pivoting movement by about 90°, the above-mentioned rotary locking begins, when the toothed ring 73 transmits its rolling rotary movement to the toothed rack 26 via the ball 74 and rotates same around the axis 18. FIGS. 22 and 23 show these operating positions. Beginning from the rotary locking, the pivoting and rotary movements of the tow bar 8 are superimposed, and the rotary locking is preserved well into the extended operating position 47. Additional locking elements may engage the tow bar 8, e.g., the top side of the bar end 11, in the operating position 47 and ensure a fixation secured against rotation. Such a fixation may also be brought about by the locking device 56 described below.

Figure 20:
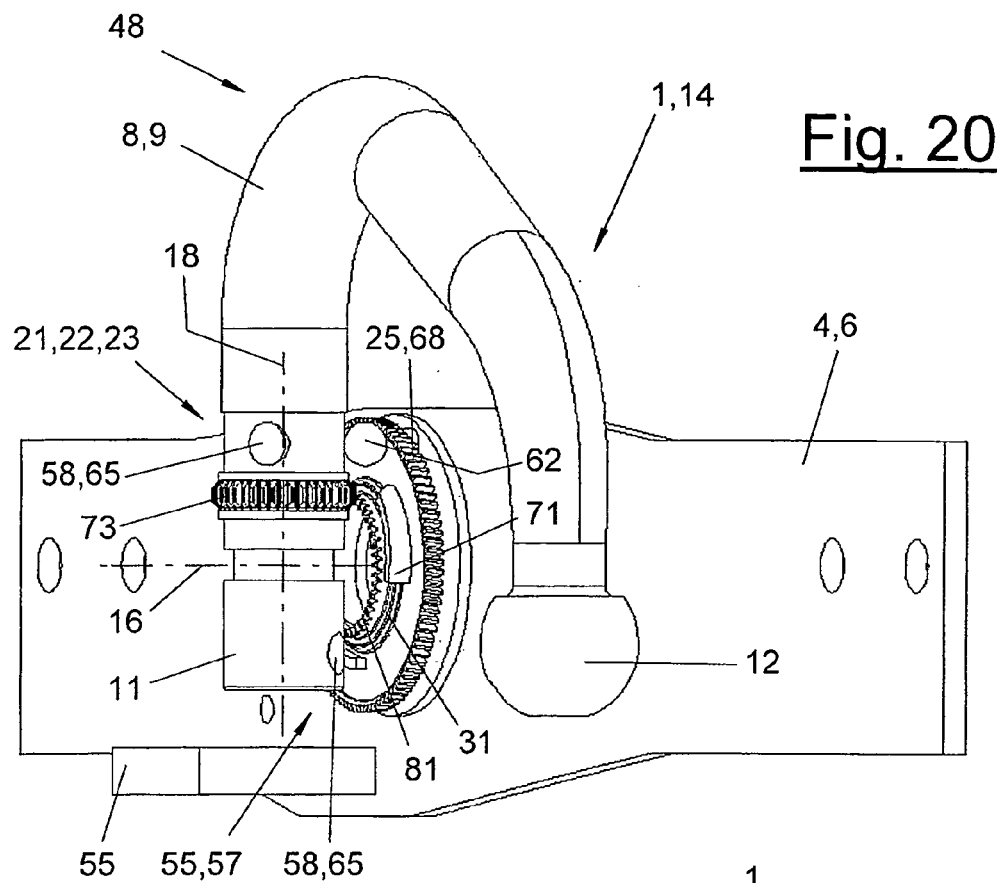
FIG. 20 is a cut-away perspective view of a third variant of the hitch in one of different movement positions.
Figure 21:
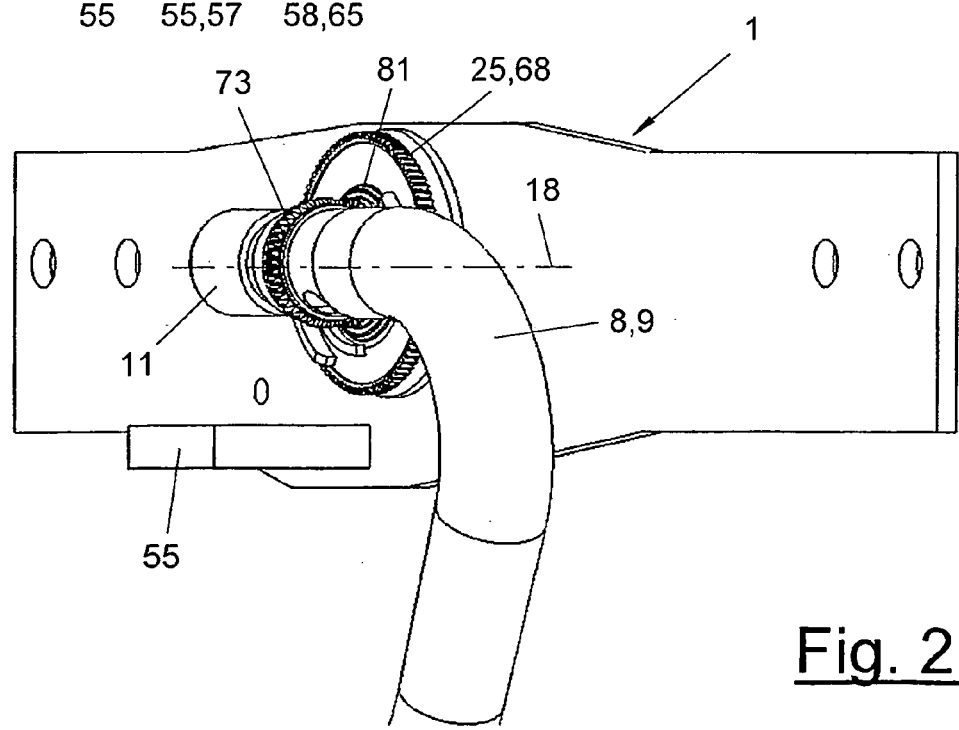
FIG. 21 is a cut-away perspective view of a third variant of the hitch in another of different movement positions.

The additional locking elements are first released for pivoting in. The tow bar 8 rotates along during the pivoting movement of the housing 19 due to the existing rotary locking at the toothed ring 73 until a fixed stop is reached at the bar mount not shown. The ball 74 is forced by the resistance of this stop out of the locking opening 76, as a result of which the rotary locking is eliminated and the toothed ring 73 can rotate freely in relation to the bar end 11. The tow bar 8 will then retain its rotated position for the rest of the pivoting path until the inoperative position 48 according to FIG. 20 is reached.

The locking opening 76 may have flattened opening flanks 77 in order to facilitate the entry and removal of the ball 74. FIG. 26 shows this arrangement. An annular recess, which encloses the toothed ring 73 and may have a step or a stop, which additionally forces the ball 74 into the locking opening 76 in the rotary locking position and holds same there during the further course of the pivoting and rotary movement, is present in the housing 19. In the area of the toothed ring 73, the bar end 11 may have an annular groove, with which the overall size and the diameter of the arrangement can be reduced. The annular groove may also be dispensed with.

FIG. 27 shows the housing 19, which has a somewhat different design in the third variant than in the other exemplary embodiments. FIGS. 28 and 29 show the assembly situation without the motor 20. At the bottom of its guide part 40, which is provided for the inner guiding of the gear 68, the housing 19 has an opening 82 for the inner toothed ring 73, which said opening makes possible the passage for the connection with the outer toothed ring 81, which is located in front of the guide part 40 in the direction of view in FIG. 27. The housing 19 has, furthermore, two or more openings 83 at the guide part 40 for the locking balls 78, which will be explained in greater detail later. The bearing journal 38 passes through the stationary support ring 31, which also forms the bearing eye. The other bearing journal 38 is mounted on the other side directly in the cross rail 4.

At least one locking device 56 is present to secure the tow bar 8 in at least one of its end positions, preferably at least in the operating position 47. This locking device 56 has a transmission device 57 for converting the rotating movement of the drive into a translatory locking movement for the actuation of positive-locking locking elements 58, 59, which act on the tow bar 8 and optionally also on the housing 19.

FIGS. 15 through 19 and 20 through 29 show two embodiments of the locking device 56 and the transmission device 57 for the operating position 47, which can be used for the first and second variants of the drive 13 and the gear mechanism 21. The initially rigid connection between the gear 68 and the support ring 31 is released for the locking in both cases, as a result of which the gear 68 can rotate around the pivot axis 16 itself. This rotary movement is used to generate the translatory locking movement. The mounting or temporary fastening of the gear 68 on the support ring 31 is greater than the resistances that oppose the pivoting movements of the tow bar 8, so that the gear 68 is fixed during these pivoting movements in a stop position, which can only be released when the tow bar 8 or optionally also the housing 19 strike the stop 55 in the end position.

In the variant according to FIGS. 15 through 19, the locking elements 58, 59 are designed as toothed racks 60, 61 and are arranged on the side of the cross rail pointing toward the front of the vehicle. The toothed racks 60, 61 are caused to mutually engage one another in a positive-locking manner by a translatory displacing movement of the tow bar 8 and the housing 19. Toothed racks 60 which extend horizontally and engage corresponding opposing toothed racks 61 at the adjacent support plate 6 are now present at both the housing 19 and the shoulder 36 of the bar. The toothed racks 60, 61 have a plurality of teeth with a preferably trapezoidal cross section, which make it possible to support strong transverse forces acting on the tow bar 8, especially the ball bead 12, due to large contact surfaces. The drawings show the locking device 56 in the starting position at the beginning of the locking movement, in which the locking elements 58, 59 are located at spaced locations from one another and do not yet mesh with each other.

To generate the translatory displacing movement of the tow bar 8, the support ring 31 is designed as a threaded sleeve 67 with an external movement thread 66. FIGS. 18 and 19 show this arrangement. The gear 68 has a corresponding internal thread. The inhibition of the movement thread 66 is greater than the resistances occurring during the pivoting movements of the two bar 8. However, as soon as the stop position according to FIG. 16 has been reached, the worm shaft 24, which continues to rotate, can rotate the gear 68 on the movement thread 66.

The gear 68 is surrounded by the housing 19 at least partially and is guided there on both sides by means of corresponding guide means 69. As a result, the gear 68 can rotate during its helical movement in relation to the housing 19, which cannot pivot in the stop position, and it carries with it the housing 19 via the guides 69 during its translatory displacing movement. Due to the displaceable mounting of the drag bearing 15, the housing 19 can now be displaced together with the tow bar 8 along the pivot axis 16 to the support plate 6 located opposite, as a result of which the locking elements 58, 59 located there become engaged. The drive motor 20 can be switched off in the locked position in a suitable manner, e.g., via limit switches or a motor current measurement.

The housing 19 may have one or more means for securing against rotation. For example, a locking pin 70, which is arranged next to the toothed rack 60, is directed in parallel to the axis 16 and engages a corresponding receiving opening at the support plate 6 during locking, is present. When the locking is to be released again in the operating position 47 to pivot the tow bar 8 into the inoperative position 48, the means 70 securing against rotation prevents the rotation of the housing 19 around the pivot axis 16, so that the drive motor 20 will at first rotate the gear 68 back into the stop position in the opposite direction by means of the worm shaft 24 and at the same time displace the housing 19 with the tow bar 8 out of the locked position. The locking pin 70 is longer here than the height of the teeth of the toothed racks 60, 61 and it still also acts as a means securing against rotation after the disengagement of the teeth. In addition, another locking element, e.g., a spring-loaded ball catch or the like, may also be present between the housing 19 and the locking-side support plate 6. The means securing against rotation can be released and the housing 19 can rotate around the pivot axis 16 to pivot in the tow bar 8 only when the gear 68 comes into the stop position at the end of the movement thread 66 and cannot rotate any further.

The engagement of the teeth for the rotating gear mechanism 23 is also closed during the return movement. The translatory locking stroke may be, e.g., about 4 mm.

In another variant shown in FIGS. 20 through 29, the locking elements 58, 59 are designed as locking balls 62, 63, 64, and their translatory locking movement is brought about by concentrically bent crank guides 71 at the gear 68, which have guide surfaces ascending obliquely outwardly in the direction of rotation for the displacement of the locking balls 62, 63, 64. The gear 68 does not need to perform any translatory displacing movement of its own in this case. It is therefore preferably mounted only rotatably and nondisplaceably on the support ring 31 fastened to the support plate 6.

One or more ball mounts 65, into which the particular corresponding locking ball 62, 63 can dip, is arranged at the bar end 11. The ball mounts 65 have a round cross section and offer a lateral guiding for the locking balls 62, 63. In addition, they are arranged in different angular positions in relation to the axis of rotation 18 and, moreover, at different axial heights at the bar end 11. FIG. 26 shows this arrangement with different line thicknesses for the visible and hidden sides. Due to this design, the locking balls 62, 63 being guided in the housing 19 at the openings 83 can reach the ball mounts 65 only when the tow bar 8 is in the stop position at the stop 55. In contrast, the locking balls 62, 63 roll on the outer circumference of the bar end 11 or the pivot bearing surface 37 during the pivoting movements of the tow bar 8 and are forced back and dipped in their guides at the housing 19 not shown. As a result, the locking balls 62, 63 also act at the same time as a means securing against rotation for the gear 68. The retracted locking balls 62,63 cannot slide up on the crank guides 71 and thus they lock the rotary movement of these guides around the axis 16.

The gear 68 can rotate and the crank guides 71 can displace the locking balls 62, 63 out of their retracted position and push them into the ball mounts 65 only when the above-mentioned stop position of the tow bar 7 is reached in the operating position 47. Additional locking balls 64 can now also be pushed into corresponding ball mounts not shown at the housing 19 or at the adjacent support plate 6 on the other side of the gear via crank guides 71 located there and bring about an additional positive-locking locking.

To release the locking device 56, the gear 68 is moved backward by means of the drive motor 20 until a stop, not shown, is reached, and the crank guides again release the locking balls 62, 63, 64. The angle of rotation of the gear 68 is correspondingly limited for this. The gear 68 acts again as a support element in its stop position, so that the further movement of the drive brings about a rotation of the housing 19 around the pivot axis 16 to pivot in the tow bar 8.

In the third exemplary embodiment according to FIGS. 20 through 29, the locking device 56 is also able to lock the tow bar 8 in the withdrawn inoperative position 48. This also happens by means of a locking element 78, preferably a locking ball, which is guided in a transversely movable manner in an opening 83 of the housing 19. The locking ball 78 engages a locking opening 79 at the tow bar 8, especially at the bar end 11, in the inoperative position 48. The engagement of the locking ball is brought about by a crank guide 80 at the gear 68, which said guide is actuated by a rotation of the gear and pushes the locking ball 78 into the locking opening 79. The rotation of the gear is achieved, similarly to the locking in the operating position 47, by the further running of the drive motor 20 and the worm shaft 24 when the tow bar 8 strikes the stop shown in FIG. 11 in the inoperative position. The locking opening 79 may have some oversize, so that the locking takes place with a slight clearance.

The locking ball 78 may have a dual function and engage in the operating position 47 the ball mount 65, which is angularly offset and at the same level as the locking opening 79.

As an alternative or in addition to the electric socket 43, the hitch 19 may have a current transfer means 84 connected with the tow bar 8, which is schematically shown in FIG. 26. The current transfer means 84 sends power and signal currents from the towing vehicle via the hitch 1 to the towed vehicle via the towed vehicle coupling 89 attached. At least one line 87 for power and signal currents, which is connected to a power supply unit and a decoder 85 on the side of the towing vehicle, is installed here in or at the tow bar 8. With the towed vehicle coupling 89 attached, the current transfer takes place through two or more contacts 88, 89 in the ball head 12 and in the coupling socket. The contacts 88, 89 may be spring-loaded in order to establish a reliable contact under all operating conditions. The contact 89 on the side of the towed vehicle is likewise connected via a line 87 with the current consumers of the towed vehicle, e.g., the lighting of the towed vehicle, the turn signals or the like.

The signal line is connected to an encoder 86 on the side of the towed vehicle. Relevant information, e.g., the function of the lighting, a turn signal or the like, is converted by means of the encoder 86 into corresponding signals, which are sent on a separate route or superimposed to the power currents to the decoder 85, where they are decoded and passed on to the towing vehicle for further use, e.g., for sending an alarm report or the like.

Various modifications of the embodiment shown are possible. The means 14 for generating the superimposed rotary movement of the tow bar 8 may have two drive motors with a common control, which act each independently and directly on the rotary axes 16, 18 and are controlled correspondingly mutually to generate the superimposed rotary movement. Furthermore, the hitch 1 may also have additional translatory and/or rotatory axes. The mechanical drive 13 may, furthermore, have one or more drive parts which can be operated manually, e.g., a crank drive, instead of a drive motor 20.

The gear mechanism 21 may have many different other designs. Instead of normal gear connections, it is also possible to use other suitable and preferably positive-locking connections. It is, furthermore, possible in this connection to provide relatively stationary support elements at the cross rail 4, which are connected with a corresponding drive gear at the bar end 11 in a directly meshing manner, so that the pivoting movement of the housing is directly transmitted to the rotation of the tow bar. Variations and adaptations are also possible here by selecting the meshing and especially the transmission ratios. Furthermore, it is possible to reverse the derivation of the rotatory movements and to assign the drive motor to the axis of rotation 18, in which case the pivoting movement of the housing 19 and of the tow bar 8 is derived from the rotary movement. Furthermore, the embodiments of the bearings, the assignments and the orientations of the rotary axes are variable as well. The other parts of the hitch 1, especially the shape of the tow bar 8, may also be varied in any suitable manner.

Moreover, various variations of the locking device 56 are possible. Any other suitable positive-locking locking elements 58, 59, e.g., pins or feather keys, which engage one another during the translatory displacing movement of the housing 19 and of the tow bar 8, may be used instead of the toothed racks 60, 61. Variants are also possible concerning the second exemplary embodiment with the locking balls. It is also possible to use rollers or other suitable locking elements instead of the locking balls to convert the rotary movement of the gear 68 into a translatory locking movement.

While specific embodiments of the invention have been shown and described in detail to illustrate the application of the principles of the invention, it will be understood that the invention may be embodied otherwise without departing from such principles.

The invention claimed is:

1. A hitch for towing vehicles, comprising: a tow bar mounted movably around at least two rotatory axes; a mechanical drive for moving said tow bar between an operating position and an inoperative position drive including means for generating a rotary movement of the said tow bar which is superimposed at least in some areas of said tow bar around said two axes.

2. A hitch in accordance with claim 1, wherein said rotatory axes are directed at right angles to one another.

3. A hitch in accordance with claim 2, wherein said tow bar has a cardanic mount with a drag bearing and with a pivot bearing with said rotatory axes intersecting.

4. A hitch in accordance claim 1, wherein said tow bar has a curved shape and is mounted with one end rotatable around an axis of rotation which is essentially vertical in the operating position and rotatable around a pivot axis directed essentially in the longitudinal direction of the vehicle.

5. A hitch in accordance with claim 4, wherein said tow bar has an angle of rotation of essentially 90° around said vertical axis of rotation and an angle of rotation of about of more than 90° around said longitudinal pivot axis.

6. A hitch in accordance with claim 1, wherein said tow bar is mounted at a cross rail for the towing vehicle in a free space of the cross rail.

7. A hitch in accordance with claim 6, wherein said tow bar is directed in a direction of the cross rail and dips into the free space of the cross rail in the inoperative position, wherein said tow bar points upward based on a curvature thereof.

8. A hitch in accordance with claim 6, wherein said hitch has a seal for closing the free space at the cross rail and/or a rear opening on an underside of the towing vehicle.

9. A hitch in accordance claim 3, wherein said tow bar is mounted with a drag bearing and with a pivot bearing with said rotatory axes intersecting an axis of rotation of the pivot bearing in a housing which is mounted rotatably around said pivot axis with said drag bearing at said cross rail.

10. A hitch in accordance with claim 1, wherein said means for generating said superimposed rotary movement is designed as a gear mechanism coupling a pivot axis and an axis of rotation.

11. A hitch in accordance claim 9, wherein a rotary movement of said tow bar around said axis of rotation is derived from a pivoting movement of said tow bar or of said housing.

12. A hitch in accordance with claim 10, wherein said gear mechanism has a plurality of coupled gear mechanism parts and a common drive motor.

13. A hitch in accordance claim 10, wherein said drive motor is moved along and is arranged at said housing or at said tow bar.

14. A hitch in accordance with claim 13, wherein said drive motor moved along acts on a first gear mechanism part designed as a pivoting gear mechanism and has a drive element connected with said drive motor in the form of a worm shaft, and an external, relatively stationary support element meshing therewith.

15. A hitch in accordance claim 14, wherein said stationary support element comprises a gear toothed on a circumference thereof.

16. A hitch in accordance claim 9, wherein a gear mechanism or a gear mechanism part converts a pivoting movement of said housing into a rotary movement of said tow bar around said axis of rotation and is arranged at or in said housing.

17. A hitch in accordance with claim 16, wherein said gear mechanism part has a toothed ring mounted with a controllable rotary locking on said tow bar and rotatable around said axis of rotation and meshing with a relatively stationary toothed ring.

18. A hitch in accordance with claim 16, wherein said toothed ring has a movable locking element cooperating with a locking opening at said tow bar to form the rotation-locked connection.

19. A hitch in accordance claim 1, wherein said hitch has one or more locking devices for controlling and fixing at least one end position of said tow bar in said operating and/or inoperative position.

20. A hitch in accordance with claim 9, wherein said hitch has an electric socket arranged at said tow bar or at said housing such that it can move together with same.

21. A hitch in accordance with claim 1, wherein said hitch has a current transfer means connected with said tow bar and with current-conducting contacts for connection with a towed vehicle coupling.

22. A hitch in accordance with claim 21, wherein said current transfer means has an encoder and a decoder with a line connection associated with said towed vehicle and said towing vehicle.

* * * * *